US012246200B2

(12) United States Patent
Rider

(10) Patent No.: US 12,246,200 B2
(45) Date of Patent: Mar. 11, 2025

(54) FIREFIGHTING APPARATUS WITH FIRE RETARDANT APPLICATION SYSTEM AND RELATED METHOD OF USE

(71) Applicant: HME, Incorporated, Wyoming, MI (US)

(72) Inventor: David J. Rider, Plain City, OH (US)

(73) Assignee: HME, Incorporated, Wyoming, MI (US)

( * ) Notice: Subject to any disclaimer, the term of this patent is extended or adjusted under 35 U.S.C. 154(b) by 540 days.

(21) Appl. No.: 17/481,721

(22) Filed: Sep. 22, 2021

(65) Prior Publication Data

US 2023/0092641 A1 Mar. 23, 2023

(51) Int. Cl.

*A62C 27/00* (2006.01)
*A62C 31/00* (2006.01)
*A62C 31/03* (2006.01)
*A62C 33/00* (2006.01)

(52) U.S. Cl.

CPC ............ *A62C 27/00* (2013.01); *A62C 31/005* (2013.01); *A62C 31/03* (2013.01); *A62C 33/00* (2013.01)

(58) Field of Classification Search

CPC ....... A62C 27/00; A62C 3/0292; A62C 5/002; A62C 5/033; A62C 31/24
USPC ...................................................... 169/14, 24
See application file for complete search history.

(56) References Cited

U.S. PATENT DOCUMENTS 4,157,733 A * 6/1979 Ewers ................. F04C 15/0061 169/24
5,836,398 A * 11/1998 White .................. A62C 3/0278 169/62
2003/0062174 A1* 4/2003 Passoni ................ A62C 3/0207 169/46
2003/0171854 A1* 9/2003 Pillar ........................ B60L 3/12 701/1
2005/0126631 A1* 6/2005 Gorman ................. A62C 27/00 137/128
2008/0060822 A1* 3/2008 Salmi ..................... A62C 27/00 169/24

(Continued)

OTHER PUBLICATIONS

Finn Titan HT 330/400 Tier IV Final HydroSeeder brochure, Feb. 1, 2019.
"A Hot New Application for Your Hydroseeding Equipment", Stormwater Magazine, Mar. 1, 2003.

(Continued)

*Primary Examiner* — Cody J Lieuwen
(74) *Attorney, Agent, or Firm* — Warner Norcross + Judd LLP

(57) ABSTRACT

A firefighting apparatus can include a system that applies a fire retardant material to provide a temporary fireproof and/or fire retardant coating to vegetation, structures and/or flammable materials. The apparatus can include a high capacity tank with an integral, internal agitator to mix liquid therein with a fire retardant polymer, such as a superabsorbent polymer, to produce a fire retardant coating material. The apparatus can include an upper deck to store bales of polymer and an access panel to load bales into the tank for continuous production of the coating material. Primary and secondary pumps can selectively pump the coating material in stationary and/or moving modes. The apparatus can be NFPA 1901 compliant, and can operate as a fire truck or vehicle. Optionally, the system can include a venturi to mix the polymer with liquid to produce the coating material. Related methods of use are provided.

18 Claims, 9 Drawing Sheets

(56) References Cited

U.S. PATENT DOCUMENTS

| | | | | |
|---|---|---|---|---|
| 2009/0014186 | A1* | 1/2009 | Collins | A62C 27/00 169/30 |
| 2013/0105182 | A1* | 5/2013 | McLoughlin | G05D 9/12 137/101.25 |
| 2015/0273254 | A1* | 10/2015 | Lenz, Jr. | A62C 27/00 169/24 |
| 2015/0352384 | A1* | 12/2015 | Wiley | A62C 3/0207 169/52 |
| 2016/0030791 | A1* | 2/2016 | Doten | B01F 27/0721 252/2 |
| 2017/0050063 | A1* | 2/2017 | Shively | A62C 33/04 |
| 2017/0291051 | A1* | 10/2017 | Lenz, Jr. | B60N 3/02 |
| 2020/0114184 | A1* | 4/2020 | Lenz, Jr. | A62C 3/02 |
| 2021/0069659 | A1* | 3/2021 | Doane | B01F 33/5026 |

OTHER PUBLICATIONS

Evaluating the Need to Add a Water Based Fire Retardant Polymer Gel to Orange County Fire Rescue Department's Arsenal for Fire Protection, by Ken Burke, an applied research project submitted to the National Fire Academy as part Of the Executive Fire Officer Program, Dec. 2002.

* cited by examiner

FIREFIGHTING APPARATUS WITH FIRE RETARDANT APPLICATION SYSTEM AND RELATED METHOD OF USE

BACKGROUND OF THE INVENTION

The present invention relates to a firefighting apparatus, such as a fire truck or other vehicle, and more particularly, to a firefighting apparatus including a fire retardant application system capable of applying a fire retardant material to provide a fireproof or fire retardant coating to vegetation, structures and/or flammable materials.

Brush fires, wild fires and forest fires can present significant hazards. After long periods of drought and heat, vegetation and other materials in the environment can become highly flammable. Where dwellings and businesses are mixed among and within the vegetation, and the vegetation or brush catches fire, structures such as homes, businesses and other buildings, as well as their occupants are at risk of being destroyed by fire.

Many fires are combatted using reactive methods. A majority of fire suppression techniques are focused on applying a liquid such as water to a fire as it burns through the vegetation, or building fire breaks to prevent the fire from reaching structures, or dousing structures with water before the fire reaches the structures. While these methods work many times, other more proactive methods have recently been developed. These methods recruit the use of fire retardant gels that are made from superabsorbent polymers. When mixed with water, the polymers become a sticky, liquid gel. The fire retardant polymers act as thickeners. The action of the fireproofing by the polymer gel is via thermal diffusion. Radiant heat from fire is absorbed and converts the liquid water to water vapor controlled by the latent heat of vaporization. As one layer of gel is vaporized, the next layer absorbs heat and continues the next fire protective process.

The fire retardant polymer has been applied to various structures such as homes, businesses and fuel tanks to prevent them from catching fire. The polymer also has been applied to create firebreaks in the path of wildfires. The polymer is applied by mixing a concentrate with water. The resulting gel is then sprayed on objects to protect from fire spread. When it is sprayed on, it adheres to the object. The method of application, however, has been deficient and inconsistent. To date, a typical application of fire retardant polymer gel has been via a conventional fire truck. The fire retardant polymer can be applied through the fire truck via standard firefighting hoses and appliances.

While the above fire truck application works, each batch must be mixed by hand before being added to tank of the fire truck, which can be tedious. Further, additional quantities of the powdered polymer must be mixed and added in the truck tank as the material is applied and consumed. Protective equipment must be used when mixing the powder with the water to reduce contact with the eyes or inhaling the material. Thus, the process of loading and applying the polymer gels to objects can be tedious, potentially dangerous and complex. The fire truck also is consumed by the retardant application process and cannot be used for regular fire suppression until the polymer gel in the tank is drained. The polymer gel further requires clean up after use from the truck, which can be laborious.

Accordingly, there remains room for improving firefighting vehicles to be capable of applying fire retardant materials in an efficient and productive manner.

SUMMARY OF THE INVENTION

A firefighting apparatus is provided to include a system that applies a fire retardant material to provide a temporary fireproof and/or fire retardant coating to vegetation, structures and/or flammable materials.

In one embodiment, the firefighting apparatus is in the form of a mobile fire truck including a chassis, a cab, a powertrain and a body. A tank can be mounted above the body and configured to store at least 2,000 gallons of liquid, with a mixer or agitator integrally mounted in the tank and configured to mix a fire retardant polymer, such as a superabsorbent polymer, in the tank with a liquid in the tank, such as water or another liquid, to produce a fire retardant coating material, which can be a gel-like and/or sticky substance having both water and the fire retardant polymer.

In another embodiment, the fire truck can include a primary pump capable of pumping at a rate of at least 1,000 GPM. The primary pump can be run off a power take off coupled to a powertrain of the truck, and can operate when the truck is stationary. The primary pump can include a first intake configured to be attached to an external water source via a hose, a first discharge, and a second intake in fluid communication with the tank and the first discharge so that the fire retardant coating material from the tank is selectively pumpable by the pump, out the first discharge.

In still another embodiment, the primary pump can be selectively operable in several modes. For example, the primary pump can be operable in a tank fill mode in which the primary pump conveys liquid from the external water source into the tank. In this mode, the primary pump on the truck itself can actually fill the tank, versus another apparatus or filler being used to pump in liquid to the tank. The primary pump also can be alternatively and selectively operable in an offload mode, in which the primary pump is in fluid communication with the tank. In this mode, the primary pump can convey liquid mixed with the fire retardant coating material out from the tank. In some applications, the offload mode primary pump can convey or pump the fire retardant coating material to a container external to the firefighting apparatus. Such a container optionally can be another vehicle, such as a truck, an aircraft, a watercraft or some other type of firefighting apparatus where rapid filling is helpful.

In yet another embodiment, the firefighting apparatus can include a secondary pump in addition to the primary pump. The secondary pump can be a standalone pump, not connected to the drivetrain of the fire truck. The secondary pump can be operated via a secondary combustion engine mounted to the chassis, or atop a body on the chassis, and can run to pump water or firefighting liquid while the truck is moving to provide pump and roll firefighting capabilities. The secondary pump can be in fluid communication with the tank and multiple nozzles mounted to the truck. The secondary pump can be operable in the pump and roll mode in which the secondary pump conveys the fire retardant coating material from the tank to the nozzles for expulsion therefrom at least 50 feet away from the firefighting apparatus. When the secondary pump is in this pump and roll mode, the primary pump can be in a drive mode where it does not pump anything from the tank or in general.

In even another embodiment, the fire truck can include an upper deck located above the tank and body. The upper deck can include a first side, a second side and a rear located above the rear of the apparatus. The upper deck can define an access panel hole and having an access panel removably mounted over the access panel hole. Through this access panel, an operator can dump or place bales of a fire retardant polymer. Those bales also can be stored upon the upper deck, above the tank and above the body of the fire truck.

In a further embodiment, the truck can be outfitted with a railing system above the upper deck so that the bales can be stored on the deck and an operator can move safely on the deck while loading bales thereon or dumping bales through the access panel. Optionally, the railing system can include a first sidewall rail extending upward above a first side of the upper deck, a second sidewall rail extending upward above the second side of the upper deck, and a third sidewall rail extending upward above the rear of the upper deck. Each of these sidewall rails can be at least 36", or other heights depending on the application.

In still a further embodiment, one or more of the sidewall rails can include a swing gate hingedly secured thereto. The swing gate opening can be wider than a bale or pallet of bales of the fire retardant polymer. The swing gate can be convertible to an open mode to load the bales onto the upper deck through the swing gate.

In yet a further embodiment, the fire truck can include an infrared image capture device projecting above the body and configured to capture images of the environment around the firefighting apparatus. The truck can further include a display mounted in the cab and configured to display the images of the environment around the firefighting apparatus. With this camera system, an operator of the truck can use the images and aim or direct the nozzles in an appropriate direction to suitably apply the fire retardant coating material to different vegetation, structures and objects near the fire truck.

In even a further embodiment, the mixer in the tank can include an elongated shaft rotatably disposed in the tank. The shaft can include multiple paddles that engage the liquid in the tank to provide a mixing action. The elongated shaft can be driven by a hydraulic motor and can be configured to rotate at least 25 RPMs to mix the liquid in the tank when the fire retardant polymer is introduced in the tank with the liquid therein.

In still even a further embodiment, the mixer or agitator in the tank can be integrally mounted inside the tank, and can be in the form of an auger or other agitator elements. The elements can be moved inside the tank via a hydraulic motor, which is driven by the secondary combustion engine. The agitator can thoroughly mix the fire retardant polymer with the liquid in the tank to produce a homogeneous mixture of the same, which can be in a gel form.

In still a further embodiment, the secondary combustion engine can operate in a pump and roll mode, wherein it runs the secondary pump to administer the fire retardant coating material through the nozzles while the truck is moving, rather than stationary, as well as an agitator mode, wherein it runs a hydraulic motor that moves the mixer, shaft, paddles, auger or other agitator elements inside the tank to adequately mix the liquid therein with the fire retardant polymer.

In still yet a further embodiment, the fire truck with the fire retardant application system can be compliant with the 2016 National Fire Protection Association Standard 1901, and subsequent versions ("NFPA 1901"), which defines the requirements for new automotive fire apparatus designed to be used under emergency conditions for transporting personnel and equipment, and to support the suppression of fires and mitigation of other hazardous situations. This Standard covers pumpers, aerial fire apparatus and a variety of other firefighting apparatus.

In another, further embodiment, the firefighting apparatus can be used in a process to treat an airport tarmac or runway. In the process, the firefighting application can apply the fire retardant material to the tarmac or runway before a distressed, damaged or compromised aircraft lands there. The treatment with the material can retard, impair or prevent excessive fire spread and destruction caused by fuel leaked from the aircraft. It also can prevent the spread of fire to nearby vegetation and/or structures.

In yet another, further embodiment, the fire retardant application system can include a venturi. The venturi can be in the form of a venturi vacuum pump that is disposed in a conduit such as a hose, cannon, nozzle and/or gun. Liquid can be conveyed through the conduit, and due to a pressure differential therein, the venturi can provide a vacuum to pull the fire retardant polymer, optionally a polymer in powder or granular form, into the venturi and a stream of liquid to mix the liquid with the fire retardant polymer therein. The material and liquid mixed together later can be filled into the tank, or ejected from the conduit or the gun associated therewith and applied for fire retardation, prevention and/or impairment.

The current embodiments provide a simple and effective mobile fire truck that is capable of rapidly applying a fire retardant material in an urban or austere area to prevent or impair fire destruction to structures in the area. Where the truck is NFPA 1901 compliant, it can be driven to fire scenes or areas of concern with warning lights flashing, in full compliance with rules and regulations concerning firefighting and emergency apparatus. The truck also can be outfitted to rapidly fill firefighting aircraft, watercraft or other vehicles with the fire retardant coating material using the primary pump, reducing the fill time and improving firefighting efficiency. Where the truck includes a secondary engine, the pump can perform pump and roll application of fire retardant materials to objects, structures and vegetation to impair the spread of a wild fire or brush fire. Any included infrared image devices can allow the operator to obtain a visual on fire and apply the materials directly and accurately. Any incorporated venturi can quickly mix a liquid with a fire retardant polymer so that mixture can be loaded into the tank or expelled from a nozzle or hose to coat a structure, vegetation or object with the fire retardant coating material.

These and other objects, advantages, and features of the invention will be more fully understood and appreciated by reference to the description of the current embodiments and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENTS

Figure 1:
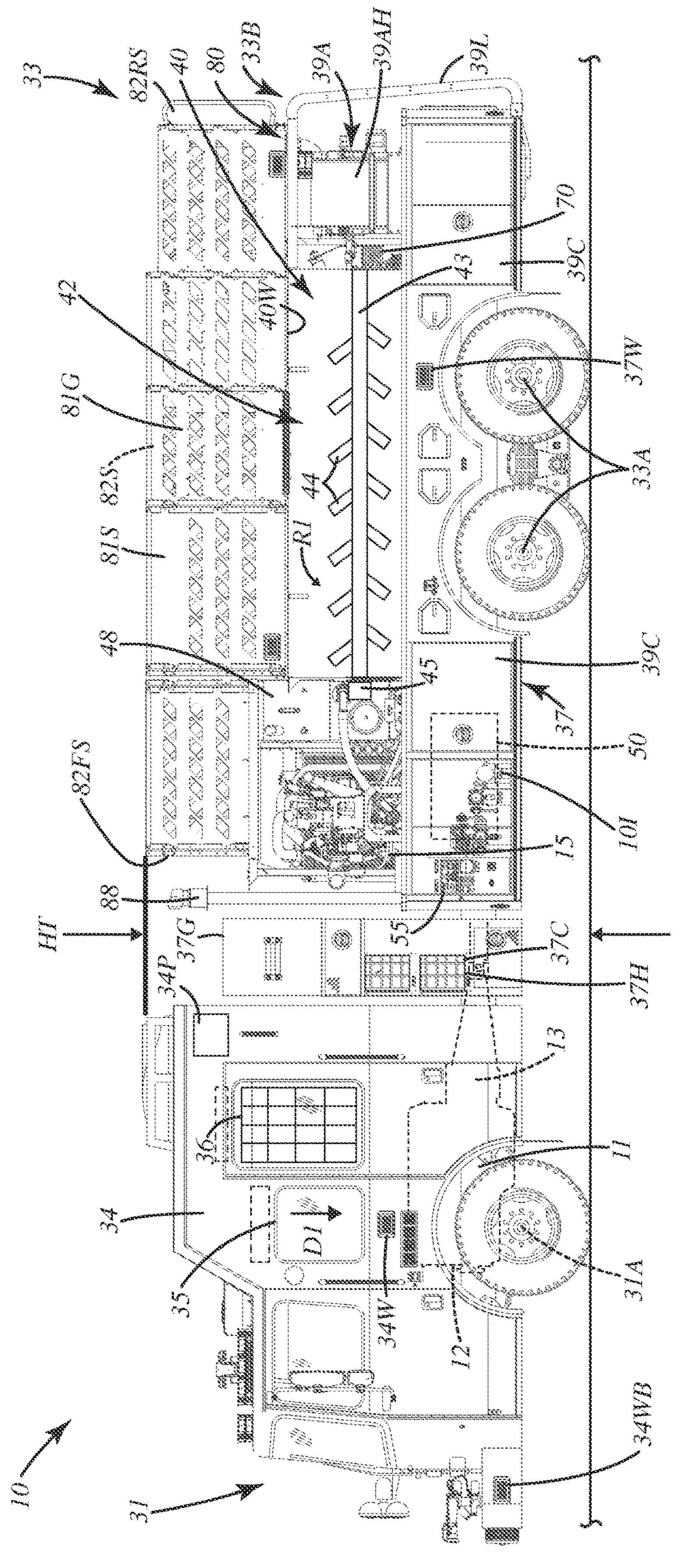
FIG. 1 is a left side view of a firefighting apparatus in the form of a pumper truck according to a current embodiment.

A current embodiment of a firefighting apparatus is illustrated in FIGS. 1-5 and generally designated 10. The firefighting apparatus can be configured to store a supply of a fire retardant polymer in the form of bales 80B or other forms atop the vehicle 10. The fire retardant polymer can be added to a tank 40 and mixed therein with liquid, such as water, to form a homogeneous fire retardant coating material, optionally in gel form, that can be sprayed from the truck 10 in one of several modes onto vegetation, structures or other objects (all referred to as objects herein) to retard, prevent, impair (all referred to as impair herein) the ignition or combustion of those objects when subjected to fire. Although referred to as a firefighting apparatus or fire truck, as used herein, those terms can also include a variety of emergency vehicles, watercraft, aircraft, rescue vehicles and other modes of transportation such as aerial ladder trucks, trailers or other equipment. Generally, the apparatus, also referred to herein as a fire truck, can be a self-propelled and mobile vehicle.

The fire truck 10 can include a chassis 11 to which a cab 34 and a body 37 are mounted. The chassis 11 can be mounted to a front axle 31A and rear axles 33A. Although shown with a double rear axle 33A, the apparatus or truck described herein can include a single or additional rear axles. The chassis can include an engine 12 connected to a drivetrain 13, including a transmission and a transfer case (not shown). The engine can be an internal combustion engine such as a diesel or gas engine. The engine can include a power take off PTO joined with a primary pump 50 as described below. The drivetrain 13 can provide movement, and power the rear axles to propel the truck via the drivetrain.

The fire truck 10 can include one or more internal electronic or computer controls that can operate the engine, transmission, or steering control mechanism to enable the front wheels to be steered upon transport to an emergency location. As used herein, an emergency location or emergency scene can be a scene of a fire, an actual or anticipated path of an oncoming fire, an area with harmful, hazardous, toxic and/or carcinogenic chemicals present, an area of a chemical spill or discharge of any type, a traffic accident, a boating accident, a plane accident, a man-made or natural disaster, and/or a terrorist attack, or any other location where one or more lives or property are endangered or otherwise compromised. As used herein, a wild fire can include any type of blaze or fire where brush, debris, trees, vegetation (live or dead), or naturally occurring elements in the environment are combusting, igniting and/or burning. The path of a wild fire can include any area where a wild fire is projected or anticipated to spread, and may or may not include man-made structures in or adjacent the path such as houses, buildings, businesses, dwellings, roads, bridges, throughways and the like.

The fire truck 10 can include a forward portion 31 and a rearward portion 33 located at opposite ends of the fire truck 10. The forward portion 31 can include the cab 34 mentioned above. The cab 34 can house occupants, such as firefighters, emergency responders, rescue personnel, or other personnel as they are transported to and from an emergency location. The cab 34 can include conventional controls, such as a steering mechanism and various displays inside the cab to monitor and evaluate the operation of the vehicle 10. The cab also can include a control panel to operate the pumps and discharge manifold. The cab can include a number of seats for the occupants, and can be the portion of the fire truck where the occupants enter and sit in the fire truck for transport. Optionally the cab can be configured to seat at least two, four, six or more occupants. The cab can include one or more doors that offer ingress and egress into the interior of the cab 34.

Optionally, the cab 34 can be set up to provide a safe haven for firefighters and its occupants in scenarios where the fire truck 10 is overtaken by a fire, such as a raging wildfire. For example, the cab can include a plurality of windows that can be covered by respective, protective curtains 35, 36 as shown in FIG. 1. The curtains can be constructed from fire retardant, fire resistant, fireproof and/or heat reflecting materials such as aramids, composites, foils and/or insulating sheets. The curtains 35 and 36 can be associated with heat or infrared sensors (not shown) that can drop the curtains in the direction D1 below a stored curtain 35. In this case, the curtain can open to the configuration of the deployed curtain 36. The curtains can shield the occupants from excess heat and fire in instances where the fire might damage, warp or melt the windows. In short, this construction can assist in providing a safe haven for occupants where a fire overtakes the truck.

Further optionally, the cab can be outfitted with a positive pressure pump 34P to maintain positive pressure in the cab 34. This can prevent gases, excess heat, smoke, particulate matter and other dangerous or toxic materials from entering the cab if the truck 10 is overtaken by fire. Incidentally, the overtaking of the truck 10 by fire may occur occasionally because the truck is designed to dispense the fire retardant coating material on objects in the path of a fire, such as a wildfire. If the wildfire gets out of hand or takes an unexpected path, the fire truck 10 can be trapped in the midst of the fire, in which case its occupants may need a safe haven until the fire passes the truck or subsides.

As shown in FIGS. 1-5, the rearward portion 33 of the truck 10 can include a body 37 that is described further below. The body can include a rear 33B of the truck. The body can be separated from the cab 34 by a distance. Between the body and cab, a cross lay hose compartment 37C can be disposed. This cross lay hose compartment can store an attack hose 37H that is folded repeatedly over itself in a serpentine manner. One or more shelves can be disposed in the compartment 37C to separate different hoses. The cross lay hose compartment can be transverse and optionally perpendicular to the longitudinal axis LA of the truck 10.

Optionally, the cross lay hose 37H can be configured to be secured and attached to the discharge 10D which is further in fluid communication with the primary pump 50 of the truck as described below. The cross lay hose 37H further optionally can be configured to be secured and attached to the intake 10I which is further in fluid communication with the primary pump 50 of the truck as described below, as well as the tank 140 of the truck as described below.

In some applications, the fire truck 10 can include a generator 37G that can be mounted above the cross lay hose compartment 37C, generally above the hose 37H disposed therein. The generator can be disposed between the cab 34 in the tank 40 as described below. This generator can be used to power lights, accessories and other equipment on or off the fire truck 10, while the firefighting apparatus is stationary. The generator can be a standalone generator including an internal combustion engine, which can be run independent from the primary engine and secondary engine mounted on the truck as described below. Of course in other cases, generator 37G can be coupled to one of the primary engine and/or the secondary engine and reliant on power therefrom.

Figure 2:
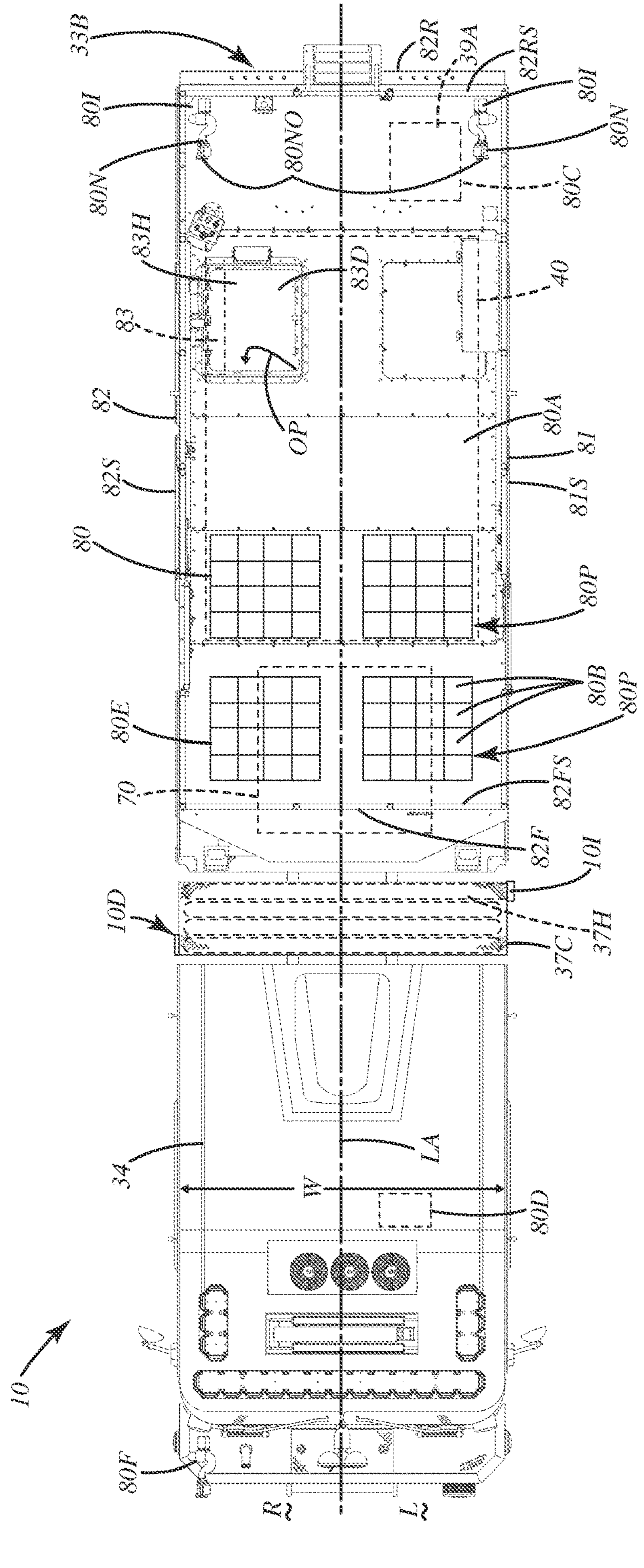
FIG. 2 is a top view of the apparatus.
Figure 3:
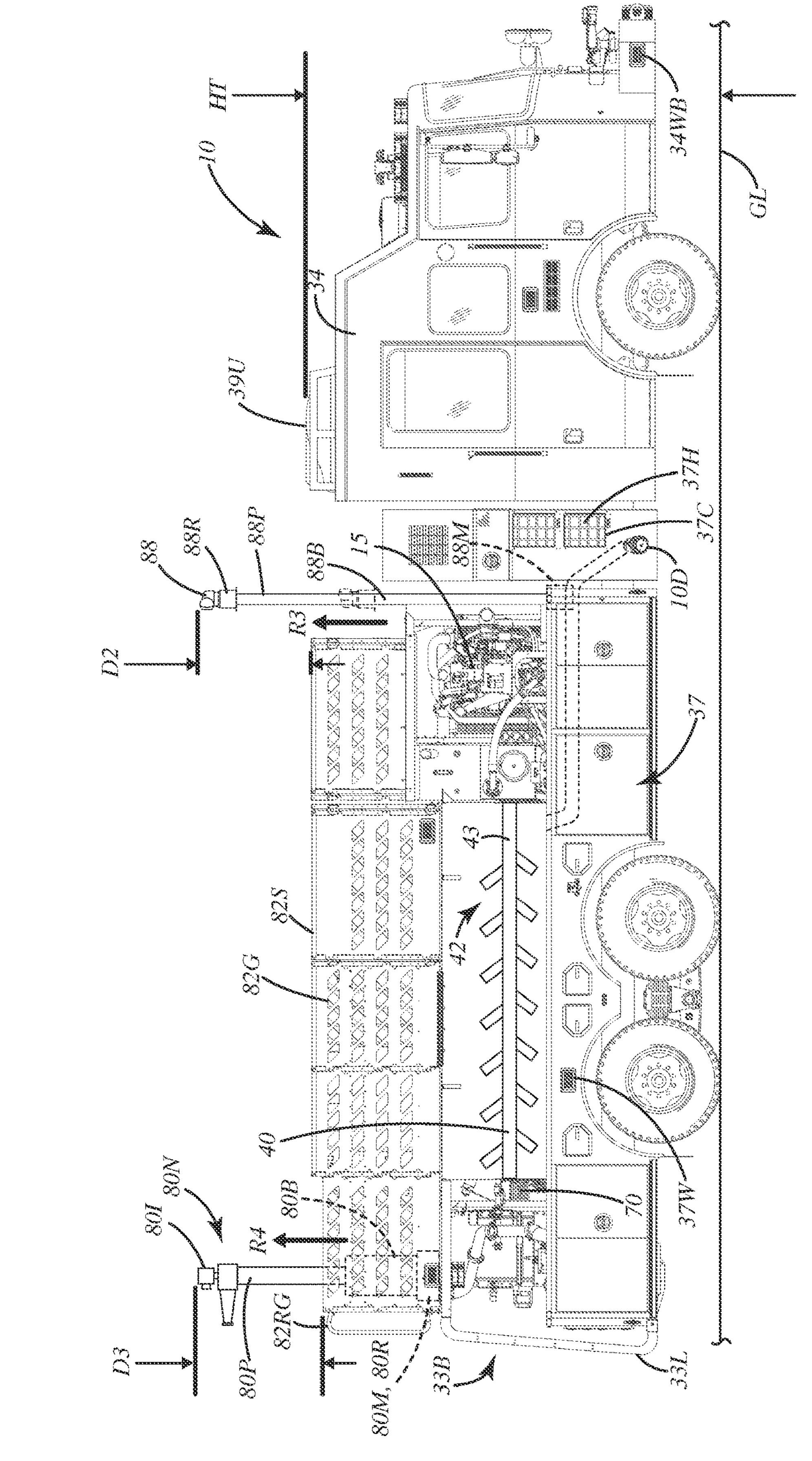
FIG. 3 is a right side view of the apparatus.
Figure 4:
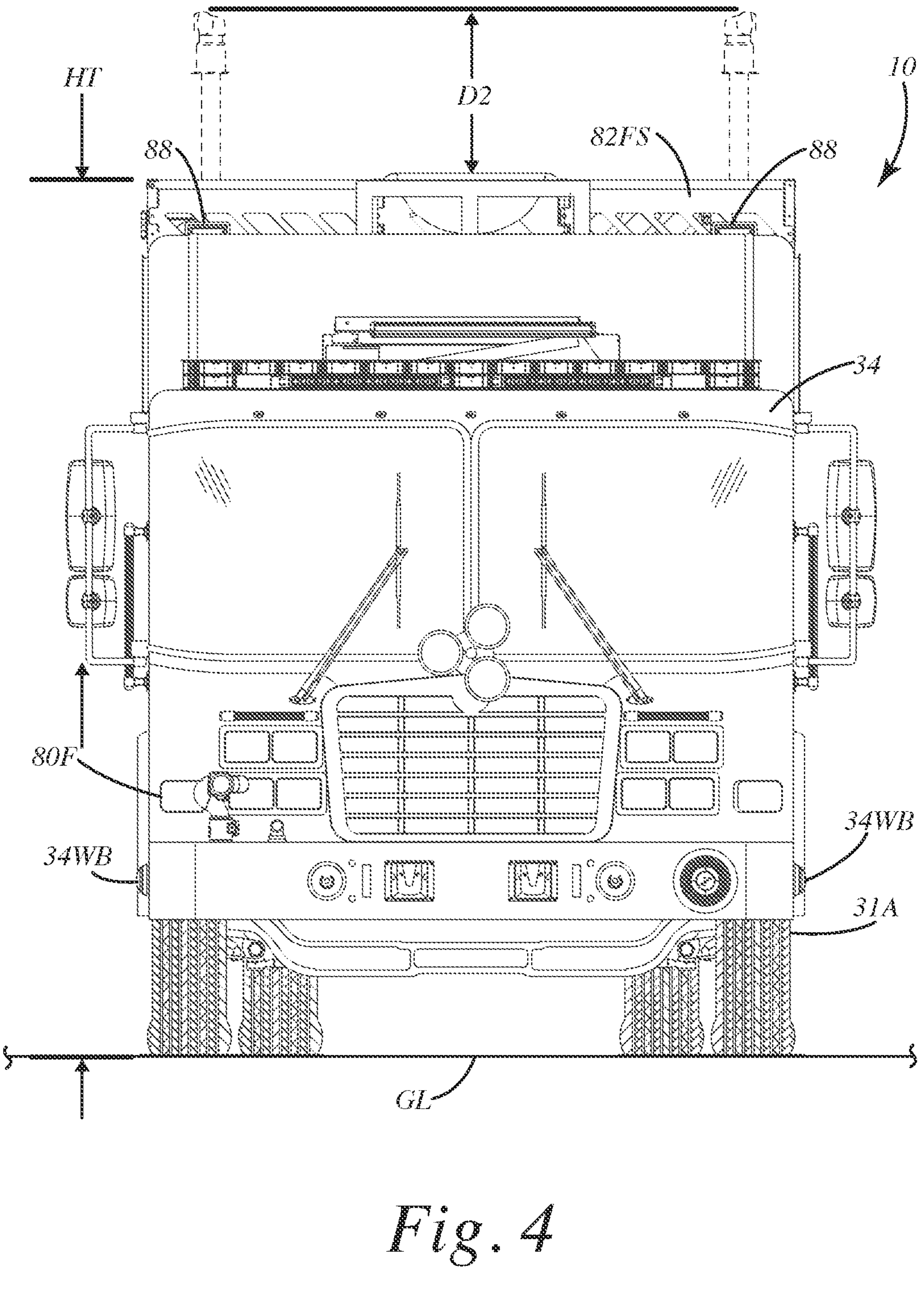
FIG. 4 is a front view of the apparatus.

As shown in FIGS. 1 and 3, the body 37 also can include compartments 39C mounted rearward of the cab in the rearward portion 33 of the fire truck 10 on one or both lateral sides R or L, which are disposed on opposite sides of the longitudinal axis LA, which extends generally along the length of the truck, optionally bisecting it as shown in FIG. 2. These compartments can be located on and accessible from the respective first side R or the second side L of the fire truck 10, and can be sized and configured to store supplies and equipment useful for easy access at an emergency location. Generally, the compartments can be sized such that they do not extend across the longitudinal axis LA of the truck from one side to the other. Put another way, the compartments generally can be shallower than one half the width W of the truck, which extends from one side of the truck to the other. Multiple lockers or compartments can fill a substantial portion of the lateral sides of the truck body. Some compartments can be mounted forward of the rear axle, some over the rear axle, and some rearward of the rear axle. Further optionally, the compartments associated with the body can be rearward of the front axle and rearward of the cab 34.

The truck 10 can be built to accommodate a variety of different storage spaces and travel areas, clearing bridges, signs, door perimeters and the like. In the embodiment illustrated, the truck can have an overall height HT shown in FIG. 3 of about 12 feet, which can be plus or minus 4-6 inches, depending on the application. The height HT can be taken to the uppermost part 39U of the truck from the ground level GL. The uppermost part or portion 39U of the truck 10 can be that part of the cab 34, body 37, sidewalls of the upper deck 80, or uppermost warning lights on any of these components. Generally, the uppermost part or portion is stationary, and does not move relative to the remainder of the truck in use, which can contrast the other parts of the truck that can telescope and otherwise move or elevate above or relative to the uppermost part 39U of the truck at a scene or emergency location, including a location along a fire pathway before the fire retardant material is applied.

The body 37 can be outfitted with a hose reel 39A as shown in FIG. 2. The hose reel 39A can be disposed at the rear 33B of the truck and accessible from the rear and one or more of the left and right sides on opposite sides of the longitudinal axis LA of the truck. The hose reel can be mounted rearward of the tank 40 and under the upper deck 80 as described below. The hose reel can include a hose 39AH, which can be a supply line, and which can be in communication with tank 40, as well as the primary pump 50 and/or the secondary pump 70 as explained below. The hose reel can be configured so that the hose can be spooled off the reel and a firefighter can walk alongside or adjacent the truck 10 while it is in motion to provide pump and roll capabilities, or to provide a line to fill the tank in some applications.

Figure 5:
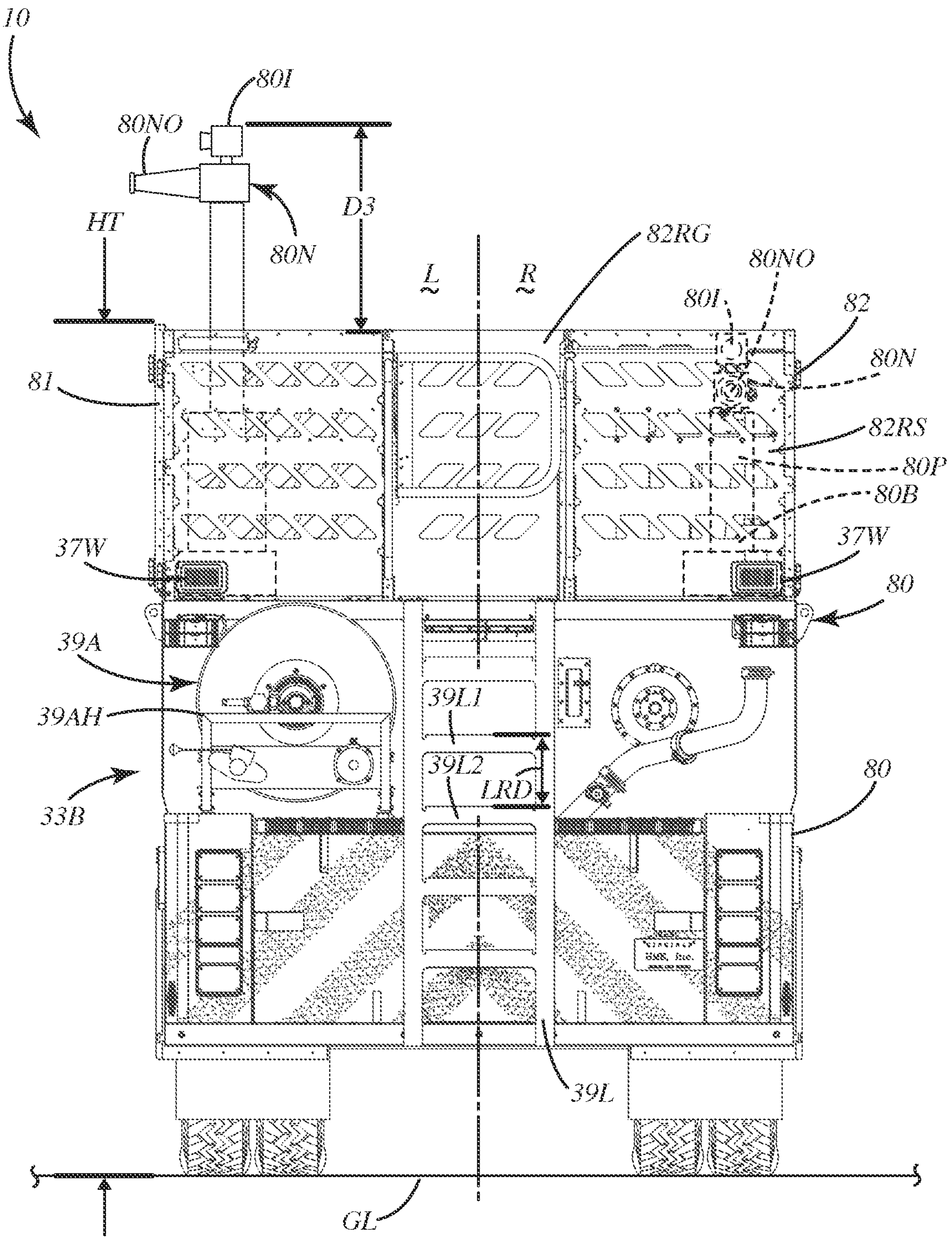
FIG. 5 is a rear view of the apparatus.

Optionally, the cab 34 and body 37 can be outfitted with a plurality of warning lights in compliance with the 2016 National Fire Protection Association Standard 1901, and all subsequent versions thereof (NFPA 1901), which is incorporated by reference in its entirety herein. Indeed, the entire fire truck and all of its components can be compliant with all requirements defined and mandated by NFPA 1901. The warning lights 37W can be mounted to the left and right sides of the fire truck in various locations dictated by NFPA 1901. Some of the lights can be mounted directly above the rear axles 33A on the left and right sides. Other of the lights can be mounted, for example, to the left and right sides, generally above the deck 80 of the fire truck as shown in FIG. 5. As explained below, these warning lights also can be disposed on the rear 33B of the truck, on opposite sides of the longitudinal axis LA. Where the truck includes a rear mounted ladder 39L, that ladder can be centered on the longitudinal axis LA between the left L and right R sides of the truck. The ladder 39L can extend upward from that rear bumper, above the body into the upper deck 80. The ladder 39L can be constructed to include multiple rungs 39L1, 39L2, etc. These rungs can be spaced a distance LRD from one another. This distance LRD can be optionally less than or equal to 24 inches, less than or equal to 18 inches, or less than or equal to 12 inches.

The warning lights 37W shown in FIG. 5 can be located on opposite sides of that ladder 39L, with the ladder 39L effectively being located between those lights. Yet other warning lights 34W can be mounted on the left and right sides of the cab 34 generally between front and rear doors of the cab. Further lights 34WB can be mounted on the respective bumpers at the front and rear of the truck 10. These warning lights can blink, flash, pulse or otherwise illuminate in various patterns while the fire truck 10 is moving along the road, throughway or other pathway.

As shown in FIGS. 1-3, the body 37 can include an upper deck 80. The upper deck 80 can be located above the tank 40 and the body 37. The upper deck can form a standing platform upon which operators of the truck can stand, move and work. The upper deck 80 can also form a support deck to support a supply of the fire retardant polymer. This supply can be in the form of bales 80B of the fire retardant polymer, optionally organized in an array or on a pallet 80P that can be supported on the upper deck. Although shown as conventional bales, these bales 80B can take on a variety of forms, and in some cases can be bags, boxes or containers that store the fire retardant polymer therein. That polymer can be in a powder, granular, fibrous or other form, depending on the particular fire retardant polymer.

As shown in FIGS. 1-3, the upper deck 80 can include a first side 81, a second side 82, a rear 82R and a front 82F. These sides can extend slightly beyond the upper surface 40U of the tank 40, optionally forward and rearward of the tank 40. The upper deck 80 also can include a central portion 80A that extends over the tank 40, as well as a forward portion 80E that extends forward beyond the tank, optionally over the secondary engine 70 and a rearward portion 80C that extends rearward beyond the tank, over the rear hose reel 39A toward the rear 33B of the truck. The forward portion 80E and rearward portion 80C of the upper deck 80 optionally do not extend over a portion of the tank 40. The upper deck also can extend the width W of the truck along with the tank 40.

The upper deck 80 can define an access hole 83 adjacent one of the sides, for example the second side 82. This access hole 83 can be disposed on the right side of the longitudinal axis LA, closer to the side 82 than to the side 81 of the upper deck. The axis hole 83 can be defined in the central portion 80A of the upper deck 80 that is disposed above the tank 40. In some cases, the upper deck can form the upper wall of the tank. In other cases, the tank can include its own upper wall that is disposed below the upper deck. The access hole 83 can include a closure 83D, which can be in the form of a door. The door 83D can be hingedly secured to the upper deck with hinge 83H. The hinge 83H can be located closer to the outer side 82 of the upper deck and an associated sidewall rail 82S than to the longitudinal axis LA. As shown, the hinge 83H can be mounted directly adjacent the side wall 82S such that when the door 83D is opened in direction OP, the door 83D rests immediately adjacent the sidewall rail 82S and is out of the way of users moving on the upper deck 80. The access hole 83 can be sized large enough to allow a bale 80B of the fire retardant polymer to be opened and/or dumped into the tank 40. The bale and/or the fire retardant polymer thus can fall via gravity into the tank. The access panel also provides direct access down into the interior of the tank 80.

As mentioned above and shown in FIGS. 1-3, the upper deck 80 can include multiple sidewall rails that extend around the deck to secure the pallets and bales thereon, and to provide a safety structure to prevent users atop the upper deck 80 from falling off the truck. In particular, the upper deck 80 can include a first sidewall rail 81S extending upward above the first side 81 of the upper deck 80, a second sidewall rail 82S extending upward above the second side 82 of the upper deck 80, a third sidewall rail 82RS extending upward above the rear 82R of the deck 80, and a fourth sidewall rail 82FS extending upward above the front 82F of the upper deck 80. Each of these sidewall rails can extend above the upper deck optionally at least 24 inches, at least 36 inches or at least 48 inches, depending on the application. The sidewall rails also can be securely mounted to the upper deck such that when the pallets 80P and/or bales 80B shift atop the truck, on the upper deck, the sidewall rails can prevent those pallets and bales from being dumped over the sides of the fire truck 10 as it moves. Further, although not shown, the upper deck can include multiple D loops or hooks thereon. These connectors can be secured to straps or tie downs, which can be secured over the bales and/or pallets in general to fix the location of the bales or pallets in position on the upper deck.

The sidewall rails also can include one or more gates that are generally convertible from a closed mode to an open mode. In the open mode, the sidewall rail defines an opening such that users can enter the upper deck and/or users can load or unload bales and/or pallets to or from the upper deck 80. For example, the first sidewall rail 81S can include a swing gate 81G, the second sidewall 82S can include a second swing gate 82G, and the rear sidewall 82RS can include a rear swing gate 82RG. The swing gates can be hingedly secured to the respective sidewall rails so that they are convertible to an open mode to load bales or offer ingress and egress to the upper deck. The gates 81G and 82G located on the opposite sides of the truck can be configured for loading bales and/or pallets. The rear gate 82 RG can be centered on the ladder 39L to provide access thereto so a user can climb up and down to and from the upper deck 80 of the fire truck 10. Of course in some cases, the rear swing gate 82RG can be used to load pallets and/or bales onto the upper deck.

As shown in FIG. 2, the fire truck 10 can be outfitted with one or more water cannons 80N which can include respective nozzles. The water cannons can be mounted on opposite sides of longitudinal axis LA, near the rear 33B of the truck and toward the rear 82R of the upper deck. The water cannons 80N can be in fluid communication with the primary pump 50 and/or the secondary pump 70 such that fire retardant coating material can be pumped and expelled from the water cannons a distance away from the truck. In some examples, the water cannons act under sufficient pressure to propel the fire retardant coating material optionally at least 25 feet, at least 50 feet, at least 100 feet, at least 150 feet, at least 200 feet, at least 250 feet, at least 300 feet, at least 350 feet, or at least 400 feet or more away from the fire truck 10. The water cannons can direct the spray on opposite sides of the longitudinal axis LA, as well as along the longitudinal axis in some applications, or in any direction away from the fire truck and its respective sides, front and rear.

Optionally, each water cannon can have mounted thereto a camera or image capture device 80I that can move with the water cannon. This device can take real-time images of the fire retardant coating material being sprayed or applied from the cannons and/or the environment around the fire truck 10. The device can be in communication with a display 80D in the cab 43 of the fire truck. The display 80D can display images from the device 80I to occupants in the cab to assist in monitoring a fire or applying the fire retardant coating material. The water cannons 80N can swivel and can be connected to a motor 80R or other actuator so that occupants inside the cab 34 can operate the water cannons 80N, moving, rotating, pivoting, swinging, or angling them in appropriate directions to apply the fire retardant coating material to vegetation, structures and/or other objects adjacent the fire truck and optionally in the path of a fire. As shown, the water cannons 80N can be mounted rearward of the access panel 83, or optionally over the rear portion 80C of the deck 80. Water cannons 80N also can be mounted so that they can operate distally from the access panel 83 so that users atop the upper deck 80 can continue to load bales 80B through the access panel while the water cannons 80N are in operation, expelling the fire retardant coating material away from the fire truck.

As noted above, the fire truck 10 can include a display 80D inside the cab 34 for occupants thereof to view the surroundings. In some cases, the fire truck 10 can be outfitted with an infrared image capture device 88. This infrared capture device 88 can include one or more infrared cameras that project above the body 37 as well as the tank 40 and in some cases a portion of the cab. The infrared image capture device can be configured to capture images in infrared of the environment around firefighting apparatus 10. In this manner, the infrared images can provide a visual display of fire hotspots or other sources of heat on the display 80D within the cab 34. With this information, an occupant or other user inside the cab actually can further move the water cannons 80N which can include respective nozzles 80NO or optionally a front mounted water cannon 80F on the front of the truck to coat objects with the fire retardant coating material, or in other cases, apply water from the truck to suppress ongoing fires as described below.

The infrared capture device 88 can be telescopingly mounted to the truck 10 so it can be elevated a preselected distance D2 above an uppermost surface 39U of the truck 10, as shown in FIG. 3. There, the image capture device can be an infrared camera mounted on an extending pole 88P that can be extended from a base pole 88B. As will be appreciated, there can be multiple image capture devices 88 mounted to the truck in a similar manner to provide a more stereoscopic or complete view of surroundings. The base pole can extend downward to and can be joined with the chassis 11, or part of the body 37 and/or cab 34 depending on the application. The extending pole 88P can project vertically above the base pole 88B. The extending pole can be telescopingly extended from the base pole such that the device gains a better vantage point for viewing and capturing images that can be transmitted, fed or transferred to the display in the cab of the truck 10. The preselected distance D2 can optionally be at least 1 foot, at least 2 feet, at least 3 feet, at least 4 feet, at least 5 feet, at least 6 feet or more above the uppermost part 39U of the truck. The image capture device 88 can be thus extended above the uppermost part of the truck. The image capture device also can be retracted from its elevated position above the truck to a second or retracted position, where the device is located at a height equal to or below the uppermost part of the truck. In some cases, the image capture device can be lowered to a position shown in FIG. 1 that is below the overall height of the truck HT. Where the overall height is about 12 feet, the device thus can be retracted below about 12 feet.

The actuation of the telescoping movement of the device 88 optionally can be provided by a telescoping mechanism 88M, which can be a rack and pinion gear mechanism associated with the base or extending pole that is electrically operated with power onboard the truck. In other applications, the telescoping movement can be via pneumatic, hydraulic, magnetic or other mechanisms associated with the poles and/or the device 88. Further optionally, the image capture device 88 can be mounted to a jointed arm mechanism that can articulate and move the image capture device, or to a scissor lift mechanism that can move the image capture device, both of which are considered herein a telescoping mechanism, and both of which can telescopingly mount the image capture device 88 to the truck and/or its components.

The telescoping mechanism 88M can be in communication with and operated via controls inside the cab. This way, a user can remain in the cab, extend the infrared image capture device 88 above the truck, and gain one or more views of the surroundings around the truck. The telescoping mechanism 88M can extend and retract the extending pole or otherwise move the image capture device above the truck without a user being outside the truck. Where multiple image capture devices are included, the multiple view from those devices can be stitched together on the display 80D so that the user inside the cab can have a panoramic view around the truck.

In some applications, the image capture device 88 can be rotated via a rotation motor 88R, which can be located below the device 88, or somewhere along the poles that support the device. The rotation motor can swivel, pivot or rotate the device 88 to obtain multiple views of around the truck. Of course, the rotation motor can be absent, with the device 88 fixedly mounted to the poles and not generally rotatable.

The firefighting apparatus or truck 10 can use the infrared image capture devices 88 in a variety of manners. In one, the truck can travel through an area, generally along a pathway of a wildfire or other fire. A user inside the cab, while the truck is moving, can actuate the telescoping mechanism to move the infrared image capture device 88 from a retracted mode, optionally below the height HT of the truck, to an extended mode a distance D2 above the uppermost part 39U of the truck. The extending pole 88P can telescope relative to the base pole 88B to achieve the extension. The pole 88P and device 88 can move in direction R3 to move from the retracted mode to the extended mode.

The device 88 as mentioned above can be in communication with the display 80D in the cab. The user thus can remain in the cab as the device is vertically deployed above the truck. Before, during and after deployment to the extended mode, the device 88 can capture infrared (and/or other) images in the environment around the truck. These can be displayed on the display to the user. The user can view hot spots from inside the cab with this system, and assist in guiding or moving the vehicle relative to the same in the pathway. With this system, the user can also assist in directing the application of the fire retardant coating material along the pathway, around the truck or distal from the truck to impair the spread of fire.

Like the infrared image capture device 88, the water cannons 80N, the nozzles 80NO and any associated image capture device 80I can be telescopingly mounted to the truck 10 so these components can be elevated a preselected distance D3 above an uppermost surface 39U of the truck 10, as also shown in FIG. 3. The cannon, nozzles and devices can be mounted on an extending pole 80P that can be extended from a base pole 80B, which can operate in a manner similar to those poles noted above with the infrared image capture device 88, optionally rotating and being elevated in a telescoping manner via a motor or telescoping mechanism 80M, which can be similar or identical to the telescoping mechanism 88M mentioned above. The rotation of the cannons, nozzles and/or devices can be provided as well via a rotation motor 80R similar or identical to the motor 88R described above. There also can be multiple such cannons, nozzles and devices, located about the upper deck, above the body, optionally on the left and right sides of the truck. The multiple mounted components can provide a broader application swath for the fire retardant coating material to be propelled from the nozzles and the truck in general, onto a wildfire pathway or other path.

The base pole can extend downward to and can be joined with the chassis 11, or part of the body 37 and/or cab 34 depending on the application. The extending pole 80P can project vertically above the base pole 80B. The extending pole can be telescopingly extended from the base pole such that the nozzles clear the sidewalls around the upper deck in some application where the sidewalls are included. The device 80I also can gain a better vantage point for viewing and capturing images that can be transmitted, fed or transferred to the display in the cab of the truck 10. The preselected distance D3 can optionally be at least 1 foot, at least 2 feet, at least 3 feet, at least 4 feet, at least 5 feet, at least 6 feet or more above the uppermost part 39U of the truck. The image capture device 88 can be thus extended above the uppermost part of the truck. The image capture device also can be retracted from its elevated position above the truck to a second or retracted position, where the device is located at a height equal to or below the uppermost part of the truck. In some cases, the image capture device can be lowered to a position shown in FIG. 1 that is below the overall height of the truck HT. Where the overall height is about 12 feet, the device thus can be retracted below about 12 feet. Optionally, the cannons, nozzles and/or associated devices can be operable in a lowered mode that maintains these components at a height of less than about 12 feet from a ground level, or optionally less than the overall height HT of the truck. Further optionally, the cannons, nozzles and/or associated devices can be operable in a raised mode that maintains these components at a height of greater than about 12 feet from a ground level, or optionally greater than the overall height HT of the truck.

The device 80I as mentioned above can be in communication with the display 80D in the cab. The user thus can remain in the cab as the cannons, nozzles and device is vertically deployed above the truck, and above the sidewalls around the upper deck. Before, during and after deployment to the extended mode, the device 80I can capture images in the environment around the truck, optionally as the fire retardant coating material is being projected from the cannons and respective nozzles. These images can be displayed on the display 80D to the user. The user can view the trajectory of the material shot from the nozzles from inside the cab with this system, and assist in guiding, moving and/or aiming the nozzles relative to the truck, toward an area that is to be treated with the fire retardant coating material. This can occur when the vehicle is stationary or moving in some cases. With this system, the user can automatically direct the application of the fire retardant coating material along the pathway, around the truck or distal from the truck to impair the spread of fire. Further, with the system, no user is needed to be located atop the upper deck or near the cannons or nozzles, as they can be automatically moved vertically and/or rotated via motors 80M and 80R.

When the truck has completed its mission at a particular emergency location, the user can retract the respective image capture devices 88, as well as the cannons 80N, nozzles 80NO and devices 80I to their retracted or lowered modes, so those items remain below the overall height HT of the truck. Thus, the truck can be moved without these components colliding with overhead signs, infrastructure or garage doors.

With reference to FIGS. 1 and 3, the fire truck 10 can include a high-capacity tank 40. This tank can be mounted above the body 37 and/or within the body 37, optionally over the rear axles 33A of the truck 10 for balance and stability. The tank 40 can have a capacity of optionally at least 1,000 gallons, at least 2,000 gallons, at least 2,500 gallons, at least 3,000 gallons, at least 4,000 gallons, at least 4,500 gallons or more depending on the size of the truck and the capacity application. The tank 40 can include an integral agitator or mixer 42. This agitator 42 can come in many forms, but as shown, can include an elongated shaft 43 with one or more paddles 44 disposed thereon a helical configuration. Of course other types of agitators can be included in the tank to generally stir, mix, slosh, agitate or move liquid and added material within the tank 40. The agitator 42 as shown, can have the elongated shaft 43 extend along and generally parallel to the longitudinal axis LA of the truck. In some cases, the agitator can include more than one elongated shaft and more than one set of paddles, offset from one another or in a helical or other pattern. Multiple elongated shafts can be disposed side-by-side within the tank, and can be parallel or transverse to the longitudinal axis LA. The agitator can be reversible, and can have a variable speed. The agitator speed and direction can be independent of secondary engine speed.

With further reference to FIG. 1, the elongated shaft 43 can be coupled to the hydraulic motor 45 that is disposed at one end of the elongated shaft 43. This hydraulic motor can be operated and powered by the secondary engine 70. The hydraulic motor 45 can rotate the paddles 44 on the elongated shaft 43 in direction R1. Of course, the hydraulic motor 45 can be configured to reverse direction of rotation, in which case the agitator can be bidirectional in rotation. In some cases, the hydraulic motor can be configured to rotate the elongated shaft 43 at a rotational speed of optionally at least 10 RPMs, at least 20 RPMs, at least 25 RPMs, at least 30 RPMs, at least 40 RPMs, at least 50 RPMs, at least 100 RPMs, at least 150 RPMs or more or increments thereof, depending on the application and the mixing action suitable for the contents of the tank 40. Further, the hydraulic motor 45 optionally can cause the elongated shaft 43 to rotate and thus the paddles 44 to move and mix the contents of the tank while the fire truck is stationary or mobile. Generally, the elongated shaft can rotate when there is liquid, such as water, within the tank 40 and bales 80B of the fire retardant polymer are added to the tank. This can break up the bales, and disperse and mix the fire retardant polymer of the bales within the liquid in the tank. As this occurs, the polymer mixes with the water and optionally can form a sticky liquid or gel. The agitator 42 can continue to run so that the material stays in a liquid or gel form, and adequately mixes the components to a homogenous condition. The rate of rotation of the shaft and the output of the hydraulic motor 45 can be regulated by a control panel or other control (not shown).

Generally, as mentioned above, the hydraulic motor 45 can be powered by the secondary engine 15. The secondary engine 15 can be in the form of an internal combustion engine, such as a gas or diesel engine. The secondary engine can be connected and configured to run the hydraulic motor 45, to move the agitator 42 in the tank 40 and/or to run the secondary pump 70. The secondary engine 15 can be mounted forward of the tank 40, generally between the cab and the tank, but under the upper deck 80. In some cases as shown, the secondary engine 15 can be mounted forward of the rear axles 33A, optionally over the intake 10I and discharge 10D. The secondary engine 15 can include its own fuel tank or can be plumbed to a primary fuel drink of the truck that also runs the primary engine 12.

Optionally, the secondary engine 15 can be coupled to a control panel 48 that can control the secondary pump 70, the hydraulic motor 45 and/or the secondary engine itself. Although not shown in detail, the control panel 48 can include a display, a throttle for the secondary engine, a pump on/off switch, an agitator speed and direction output display, an emergency stop and other controls. An additional engine start/stop switch can be located on the rear bumper or in the cab (not shown).

The secondary pump 70, which can be operated via the secondary engine 15, can be a centrifugal pump. The secondary pump can be mounted above the body 37 and below the upper deck 80, optionally rearward of the tank 40 as shown, or in other locations on the truck. The secondary pump 70 can be in fluid communication with the tank 40 so that it can draw and move water and/or fire retardant coating material mixed in the tank out from the tank and through various elements on the truck. For example, the secondary pump can be in fluid communication with the water cannons 80N mounted atop the upper deck, the front water cannon 80F and/or the hose 34AH on the hose reel 39A at the rear 33B of the truck. One or more of these water cannons can be opened and placed in fluid communication with the secondary pump so that the fire retardant coating material, or water or other liquid in other operations, can be pumped through the respective nozzles or discharges on the truck 10.

In some applications, the secondary pump 70 can provide the fire truck with a pump and roll capability. Again the water cannons, hoses and the reels can be in fluid or liquid communication with the secondary pump 70 and capable of pumping liquid so that the pump can pump liquid from the tank 40 selectively through the hoses on the hose reel and/or the water cannons while the truck is moving along a street, road or other surface. As this occurs, the water cannons can spray structures, vegetation or other objects that the truck passes within range to coat the object with the fire retardant coating material, with the hopes of impairing or preventing the objects from igniting or combusting when subject to a fire moving along a pathway.

The fire retardant coating material herein can be produced via the mixing of a liquid, such as water, whether purified or from a water system or tank, and a fire retardant polymer. The types of fire retardant polymers used herein can be superabsorbent polymers, which can be chemical compounds forming long chains of molecules. One type of superabsorbent polymer useful herein is potassium polyacrylate or sodium polyacrylate, which is capable of soaking up to optionally 300 times, 500 times or 800 times its weight in water. Generally the fire retardant polymers herein, when mixed with water, become a sticky gel through a process known as hydration. The fire retardant polymers can encapsulate water droplets in a bubble-like shell. That shell is rather sticky in the gel form. It is believed that when the fire retardant coating material is applied to an otherwise flammable or combustible part of an object, the action of fireproofing or fire retardation by the material is affected through thermal diffusion. Radiant heat from the fire is absorbed and converts the liquid or water in the shells to a water vapor. When this vaporization occurs, it absorbs the heat in the next layer, absorbs further heat and continues the protective process. It is noted that the fire retardant coating material herein sticks or adheres to virtually any surface. Accordingly, it is suitable for application to a variety of different structures, vegetation and other objects which might lay within a known or anticipated or random path of a fire to prevent that fire from igniting or combusting the object.

The secondary pump 70 can be capable of pumping liquid at a rate of optionally at least 100 gallons per minute (GPM); at least 150 GPM; at least 200 GPM; at least 400 GPM, at least 500 GPM or at least 600 GPM. The secondary pump 70 can pump the fire retardant coating material independently from the primary pump 50. Each of these pumps can be in fluid communication with a discharge manifold that can be further operated by a control panel to pump water to and from the tank on board the truck 10. As mentioned above, the secondary pump 70 is capable of operating in a pump and roll mode, in which the primary pump 50 is off and the secondary pump 70 is powered by the secondary engine 15, providing pressurized liquid and/or fire retardant material to the various water cannons and/or hose reel. In a stationary mode, however, the secondary pump 70 can be off and the primary pump 50 and can convey liquid and/or the fire retardant coating material to or from the tank.

Moving on to the primary pump 50, reference is made to FIGS. 1-3. The primary pump 50 can be operated to pump liquid or the fire retardant coating material at a particular flow rate from the truck to the various discharge outlets and lines associated with the truck and described above. Alternatively, the primary pump 50 can pump liquid from an external water source via a hose to fill the tank 40. The primary pump 50 optionally can be a 1,500 GPM midship pump, which can be supplemented with the secondary pump 70 as described above. The primary pump 50 can be mounted between the cab and the body of the truck, and/or slightly below one or the other or both, within the chassis. The pump can be mounted via brackets to the chassis. The pump can be further coupled to the transfer case or otherwise to the drivetrain 13 of the truck via a PTO. As mentioned above, the engine can run the PTO to operate the primary pump 50 while the truck is stationary.

Depending on the application, the pump can vary. Generally, however, the primary pump can be rated for firefighting use and compliant with NFPA 1901, Chapter 5.2 and/or Chapter 16.1-16.13. In one embodiment, the pump can be capable of pumping liquid optionally at a rate of at least 1,000 GPM; at least 1,200 GPM; at least 1,500 GPM; at least 2,000 GPM; or between 1,000 GPM and 1,750 GPM, inclusive. Other sized primary pumps can be selected, depending on the application, the engine rating, and the type of truck to be utilized. Generally, a higher GPM pump, in excess of 1,000 GPM can be utilized with the fire truck 10 so that it is capable of providing long powerful streams of liquid or fire retardant coating material to reach vegetation, structures and objects located a far distance from the firefighter and/or the truck so as to rapidly and efficiently coat those objects with the fire retardant coating material.

The primary pump 50 can be in fluid communication with a first intake 10I. That intake can include a connection that allows the intake to be connected to an external water source via a hose, for example, the hose 37H or some other supply hose. The external water source can be a hydrant, a water main, or a natural water source such as a pond, river, lake or pool of water. The external water source can provide a source of water or liquid to be loaded into the tank 40. The primary pump can be operable in a tank fill mode, in which the primary pump is in liquid fluid communication with the tank. In this case, the primary pump can draw water from the external water source and pump it into the tank. Due to the high flow capacity of the primary pump, this can allow the truck the ability to quickly load the tank with a liquid. Of course, after the liquid is loaded in the tank, the fire retardant polymer bales can be dumped into the tank. The bales optionally can fall via gravity, and can enter the liquid. The fire retardant polymer from the bales can mix with the liquid therein to produce the fire retardant coating material. Subsequently that material can be quickly and efficiently used in coating and/or fireproofing objects in a particular location along an anticipated path of a fire.

Figure 6:
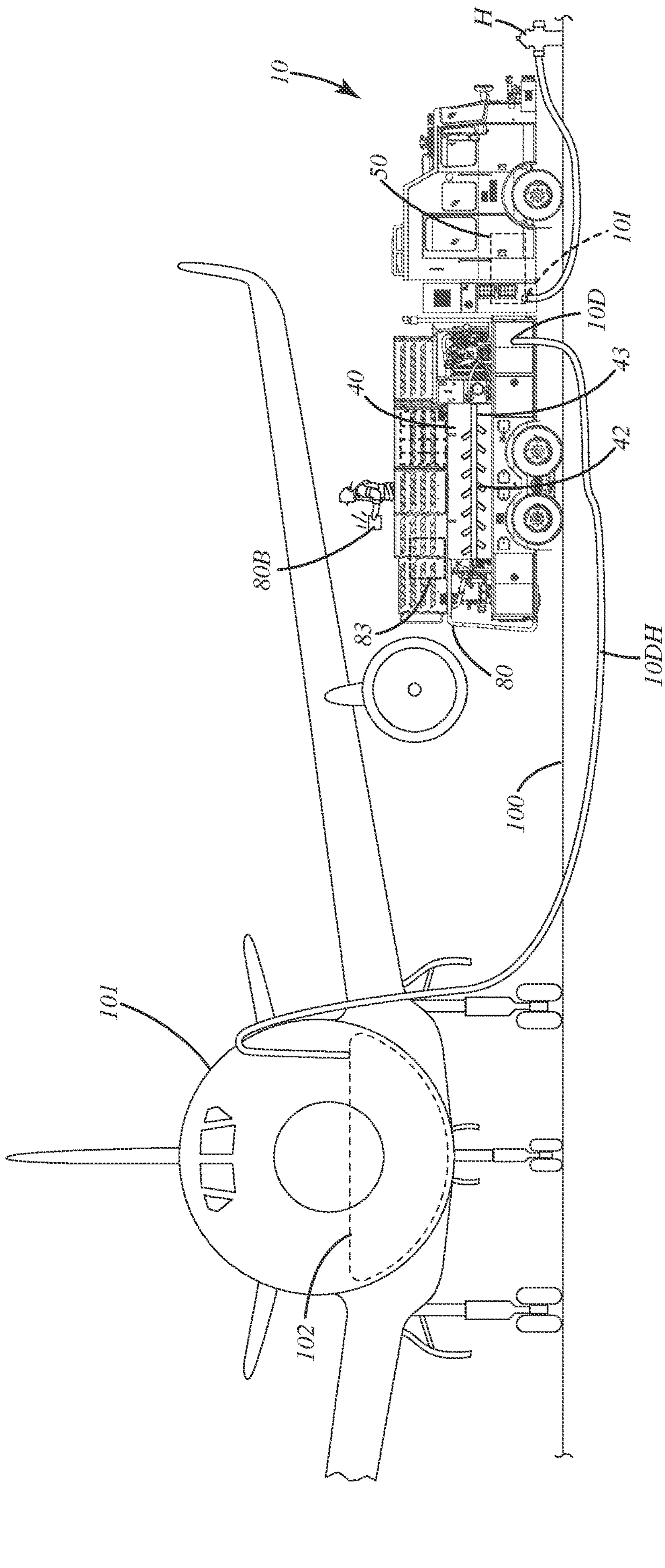
FIG. 6 is a side view of the apparatus filling another vehicle with fire retardant coating material.

The primary pump 50 also can be operable in an offload mode in which the primary pump is in fluid communication with a tank, optionally via a manifold (not shown). In this mode, the primary pump can pump the already mixed fire retardant coating material out the discharge 10D, optionally through a hose, to a container that is external to the fire truck 10. This offload mode can be useful where the fire retardant coating material is to be loaded onto an aircraft, such as a fire airplane or fire helicopter, or from a watercraft or some other vehicle. It also can be useful where large quantities of the fire retardant coating material are to be mixed, using the bales and the polymer and a liquid, for use at a later time. Given the extremely high flow rates of the primary pump, already mixed and prepared fire retardant coating material can be pumped directly from the tank on the truck directly to the external container, for example, onto a plane.

Where firefighting planes are in heavy use fighting a wildfire, this can accelerate the mixing and loading of the planes with the fire truck 10. For example, as shown in FIG. 6, the fire truck 10 is located on a tarmac or runway 100. A firefighting plane 101 is located on the tarmac 100. The firefighting plane 101 can be refilled with an amount of fire retardant coating material. The fire truck 10 can be parked adjacent the plane 101. A hose 100H can be placed between the truck 10 and the plane 101 to provide fluid communication between the truck and the plane. The primary pump 50 can be powered by the primary engine 12 while the truck 10 is in a stationary mode. The primary pump 50 can pump an already mixed quantity of the fire retardant coating material within the tank 40 out the hose 100H to a container 102 located in the plane 101 to fill the plane.

In some cases, the plane tank can have such a large capacity that when the tank 40 is drained, it is difficult to fill the plane with only one tank 40 from the truck. In this case, the truck 10 can then shift to a tank fill mode to take in water from the inlet 10I from an external water source, such as a hydrant H to which the truck 10 is hooked up. Due to the high flow of the primary pump 50, that pump can quickly fill the tank 40. As the tank is being filled anew, an operator atop the upper deck 80 can add additional bales 80B of the fire retardant polymer to the tank 40 through the access hole 43. The agitator 42 can be run to mix the added liquid in the tank 40 with the newly added fire retardant polymer from the bales 80B. In this manner, the truck 10 can operate as a factory for producing large quantities of the fire retardant coating material. The fire truck also can self-fill the container 102 of the firefighting aircraft 101 after it completes the mixing of the components. Again, because the fire truck has the capability of self-mixing liquid with the fire retardant polymer within the tank via the agitator, the fire truck can be a substantial asset in preparing that material for quickly and efficiently loading the firefighting plane, or any other craft and/or vehicle that can store large quantities of fire retardant coating material.

In some applications, the primary pump 50 can operate in an application mode. In this mode, a hose can be connected to the discharge 10D and/or one or more of the water cannons 80N and 80F via a manifold. In the application mode, the primary pump and truck can operate in a stationary mode as well in which the truck is not moving. After a sufficient amount of fire retardant coating material is applied at a given location, the primary pump 50 can be turned off, and the truck can be moved to the next location to douse surrounding structures, vegetation or other objects with the fire retardant coating material.

The primary pump 50 can be operated via a control panel 55 in its various modes, such as the tank fill mode, the offload mode in the application mode. Likewise, the secondary pump 70 also can be operated via the control panel in its various modes. The control panel can be in communication with and control a manifold (not shown) that provides the various fluid communications between the primary pump and the secondary pump with the other components of the fire truck including the inlet, discharge, water cannons, hose reel and the like. The control panel also can control the primary pump and secondary pump's connections to the manifold. For example, when the truck is in the stationary mode, the control panel 80 can turn off the connection between the secondary pump in the manifold, allowing the primary pump to pressurize the manifold. When the system is in the pump and roll mode, the control panel can be used so that the secondary pump can pressurize the manifold and distribute water accordingly to the respective supply lines and hoses for the pump and roll operation.

As mentioned above, the fire truck 10 herein can be operable in a pump and roll mode and/or an application mode in which the secondary pump or primary pump respectively can administer the fire retardant coating material to vegetation, structures and other objects. It is contemplated that in either of these modes, the fire truck 10 can be useful in airport or aircraft landing environment, at which a distressed aircraft might land. A distressed aircraft can be any type of aircraft, private or commercial, that may have stuck landing gear, a malfunctioning engine, or damaged or nonfunctioning components that may necessitate an emergency landing. A distressed aircraft presents a potential risk because it can be prone to catching on fire due to fuel carried by the aircraft being spilled upon an irregular landing. The fire truck 10 of the current embodiments can be used to pretreat an area on the runway and/or an associated tarmac before landing the aircraft thereon. It is contemplated that this pretreatment with the fire retardant coating material on the ground, the tarmac, vegetation and other objects in the vicinity of the landing path of distressed aircraft may/can minimize ignition and combustion of the aircraft and its contents and/or the spread of fire due to spilled fuel.

Figure 7:
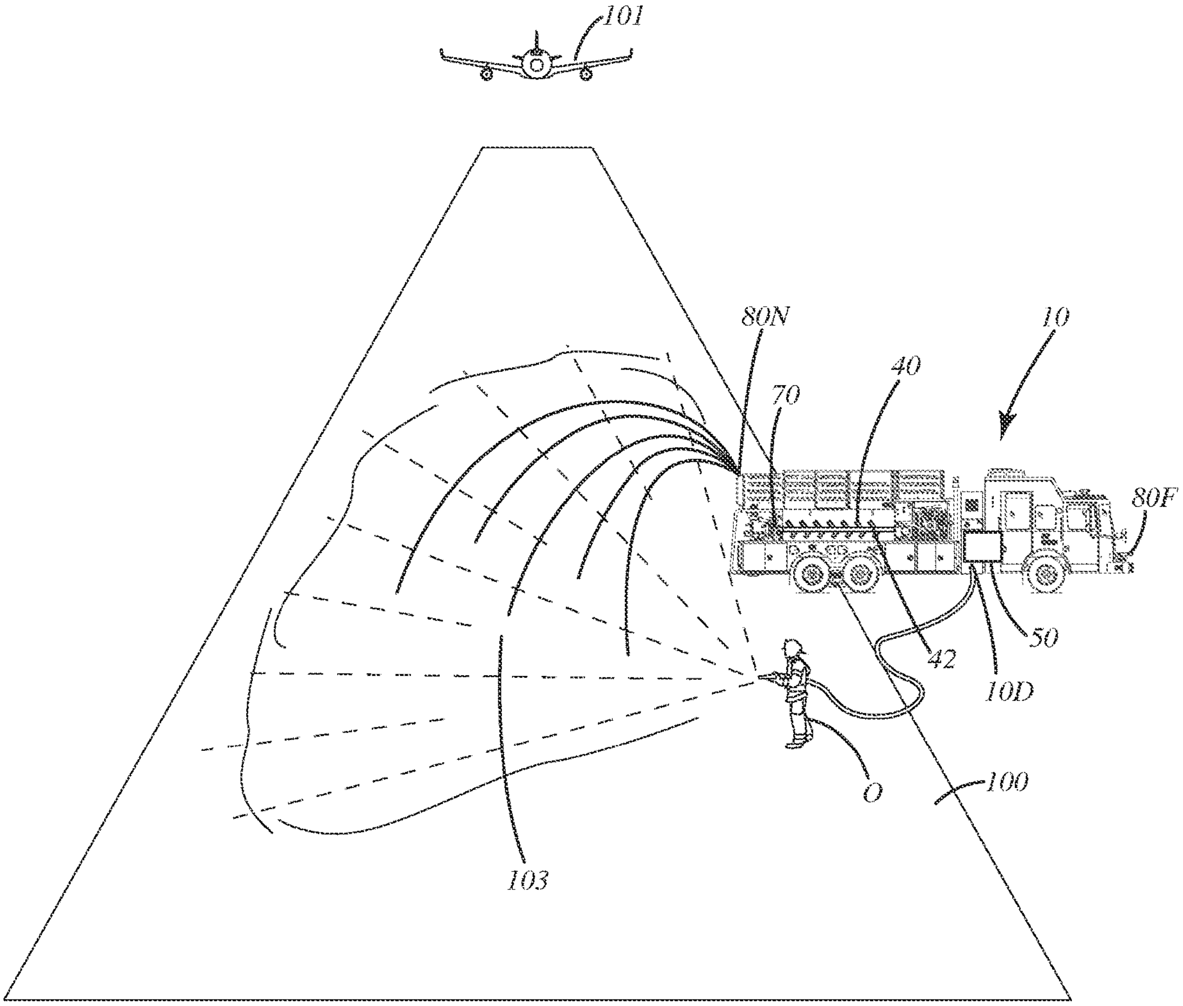
FIG. 7 is a perspective view of the apparatus preparing a runway for a distressed aircraft.

With reference to FIG. 7, use of the fire truck 10 to treat a tarmac or runway 100 before landing of a distressed aircraft 101 will be described. In particular, the fire truck 10 can be positioned on the tarmac 100. The tarmac can be located in the path of a distressed aircraft 101. The truck 10 can be readied for this activity by loading fire retardant polymer in bales through the access panel as described above, into the tank 40 on board the truck 10. The agitator 42 inside the tank can mix liquid in the tank with the fire retardant polymer to produce the fire retardant coating material stored in the tank. After the fire retardant coating material is produced, the fire truck 10 can apply the material in an area 103 along the tarmac 100.

This application can occur while the truck is in the stationary mode or any pump and roll mode. In the pump and roll mode, the secondary pump 50 can be in operation as the fire truck moves along the tarmac within the path of the distressed aircraft 101. The secondary pump can convey the fire retardant coating material from the water cannons and the respective nozzles 80N, 80F. During this time, the truck can move optionally at a speed of about 1 to about 10 miles per hour along the tarmac. Of course other speeds can be selected depending on the application rate, material applied and other conditions.

In some cases, the fire truck 10 can be parked in a stationary position. In this case, the primary pump 50 can be actuated. A hose can be connected to the discharge 10D and an operator O can spray the fire retardant coating material through a nozzle associated with the hose via the primary pump. Due to the high pressure created by the primary pump, the fire retardant coating material can be projected optionally at least 50 feet, at least 100 feet, at least 150 feet, at least 200 feet or more from the fire truck 10.

The fire truck 10 in this application can be quickly reloaded via the primary pump pumping water from an external source into the tank 40. The operator O can reload bales of the fire retardant polymer and mix that with the water in the tank to produce the fire retardant coating material. The process can be repeated to apply fire retardant material to the area 103 in the path of the distressed aircraft 101.

With the fire retardant coating material administered on the tarmac and/or runway, when the distressed aircraft lands and spills fuel on the tarmac over the area including a fire retardant material, if the fuel catches on fire, it can be extinguished and/or starved out due to the fire retardant coating material on the tarmac. As a result, combustion of the spilled jet fuel can be reduced and/or the ignition can be prevented.

Figure 9:
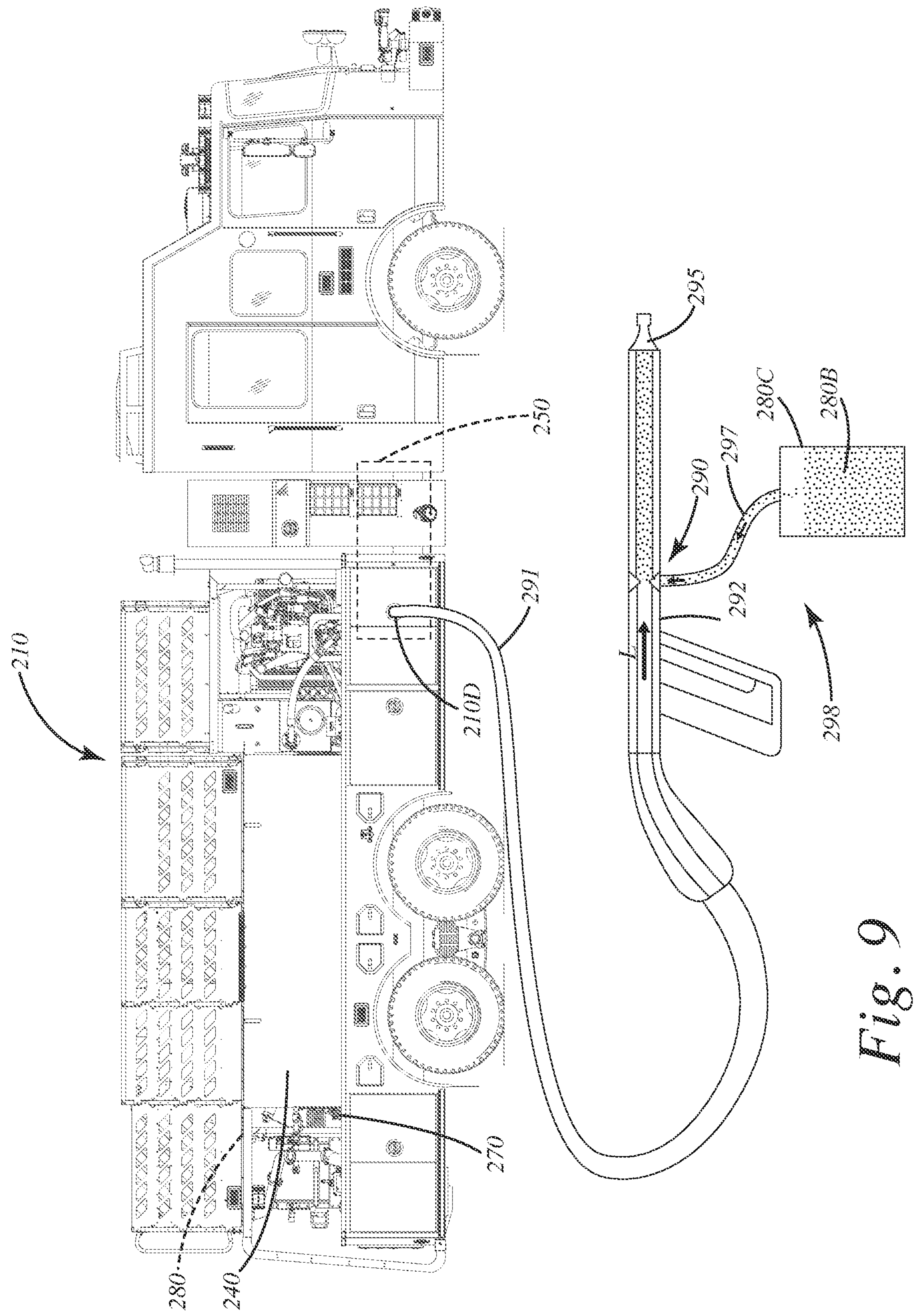
FIG. 9 is a side view of a second alternative embodiment including another venturi device.

A first alternative embodiment of a firefighting apparatus including a fire retardant application system capable of applying a fire retardant coating material is illustrated in FIG. 9 and generally designated 110. The apparatus in this embodiment can be similar in structure, operation and function to the embodiment described above with several exceptions. For example, the firefighting apparatus can be in the form of a fire truck 110. The fire truck 110 can include a primary pump 150 and a secondary pump 170 as well as a tank 140 with an upper deck 180 disposed above it. The upper deck can support a pallet 180P having bales 180B of a fire retardant polymer. In this embodiment however, the agitator in the above embodiment can be absent from the tank 140. Of course, in some applications, it might be present. This embodiment can use a venturi 190 that is plumbed into a conduit 191 in fluid communication with the primary pump 150 and secondary pump 170, which of course can be in fluid communication with the various inlets, discharges, water cannons and other nozzles mentioned in the embodiment above. The conduit 191 can extend to an intake end 192 that is disposed in and/or forms a portion of the tank 140. The intake end 192 can draw liquid from the tank 140 so the liquid eventually flows to the conduit 191. Accordingly, as the liquid is drawn through the conduit 191 and the venturi 190, the venturi 190 draws a vacuum. The venturi 190 can be connected to a drop tube 197 that is further connected to a funnel 195. The funnel 195 can be further secured to an end of a bin 193 having a rotating auger 194 disposed therein. The auger 194 can be rotated via an auger motor 197.

The auger motor 197 can turn the auger 194 so as to move fire retardant polymer P stored in the bin 193 to the funnel 195 and ultimately to the drop tube 197. From there, the vacuum of the venturi 190 can pull the fire retardant polymer, which can be in a powder, granulated, fibrous, or other loose and flowable form. As the vacuum from the venturi pulls the fire retardant polymer material, that material is injected into and mixed with liquid L flowing through the conduit 191 and the venturi 190. As a result, the liquid and the fire retardant polymer mix form a fire retardant coating material which is then subsequently pumped through the primary pump and/or the secondary pump and out from the fire truck onto vegetation, structures and/or other objects to coat them as described in the embodiment above.

Optionally, the apparatus 10 can include a conveyor 196 that can convey individual bales 180B into the bin 193 from a pallet 180P. Further optionally, the apparatus can include a picker 198 that automatically picks individual bales 180B off the pallet 180P with a clamping arm 199 or other apparatus that can grab and move individual bales 180B. With this construction, the apparatus 110 can automatically feed bales 180B to the conveyor, which subsequently deposits the bales in the bin 193. The auger 194 moves the fire retardant polymer into the supply line 197 and ultimately to the venturi 190 which pulls the fire retardant polymer into the liquid to mix it therewith and produce the fire retardant coating material. Although not shown, the apparatus 110 can be outfitted with a control system that monitors the number of bales 180B input into the bin and/or the amount of fire retardant polymer fed into the venturi 190 so as to ensure the proper mixture of liquid and fire retardant polymer to produce the fire retardant coating material that is pumped through the respective pumps 150 and/or 170.

In some applications, the picker 198 can deposit the bales 180B directly into the bin 193, and the conveyor can be absent from the apparatus 110. In other applications, the picker and conveyor can both be absent, an operator can manually feed bales 180B into the bin 183.

A second alternative embodiment of a firefighting apparatus including a fire retardant application system capable of applying a fire retardant coating material is illustrated in FIG. 9 and generally designated 210. The apparatus in this embodiment can be similar in structure, operation and function to the embodiments described above with several exceptions. For example, the firefighting apparatus can be in the form of a fire truck 210. The fire truck 210 can include a primary pump 250 and a secondary pump 270 as well as a tank 240 with an upper deck 280 disposed above it. The upper deck 280 can support pallets having bales of a fire retardant polymer. In this embodiment however, a venturi 290 can be included in a hand wand 292 or a similar nozzle. The hand wand 292 can be secured to a hose 291 that is attached to a discharge 210D on the fire truck and in fluid communication with the primary pump 250 and/or the secondary pump 270. Of course, the hose 291 can be attached to virtually any other discharge or line on the truck depending on the application.

The hand wand 292 can include a venturi 290 disposed therein. The venturi 290 can be in fluid communication with a supply line 297 that is connected to a container 280C. Inside the container 280C, the fire retardant polymer 280B can be disposed. That fire retardant polymer can be obtained from a bale or other type of supply, optionally in a powdered, granulated, fibrous or other form and stored in the container 280C. The container 280C can be detached from the wand 292 as shown or in another application attached directly to the wand so that the two can move as a unit. In other cases, the container 280C can be larger yet can include wheels so that it can be moved and placed in different locations and secured to the wand 292 with the supply line 297.

Figure 8:
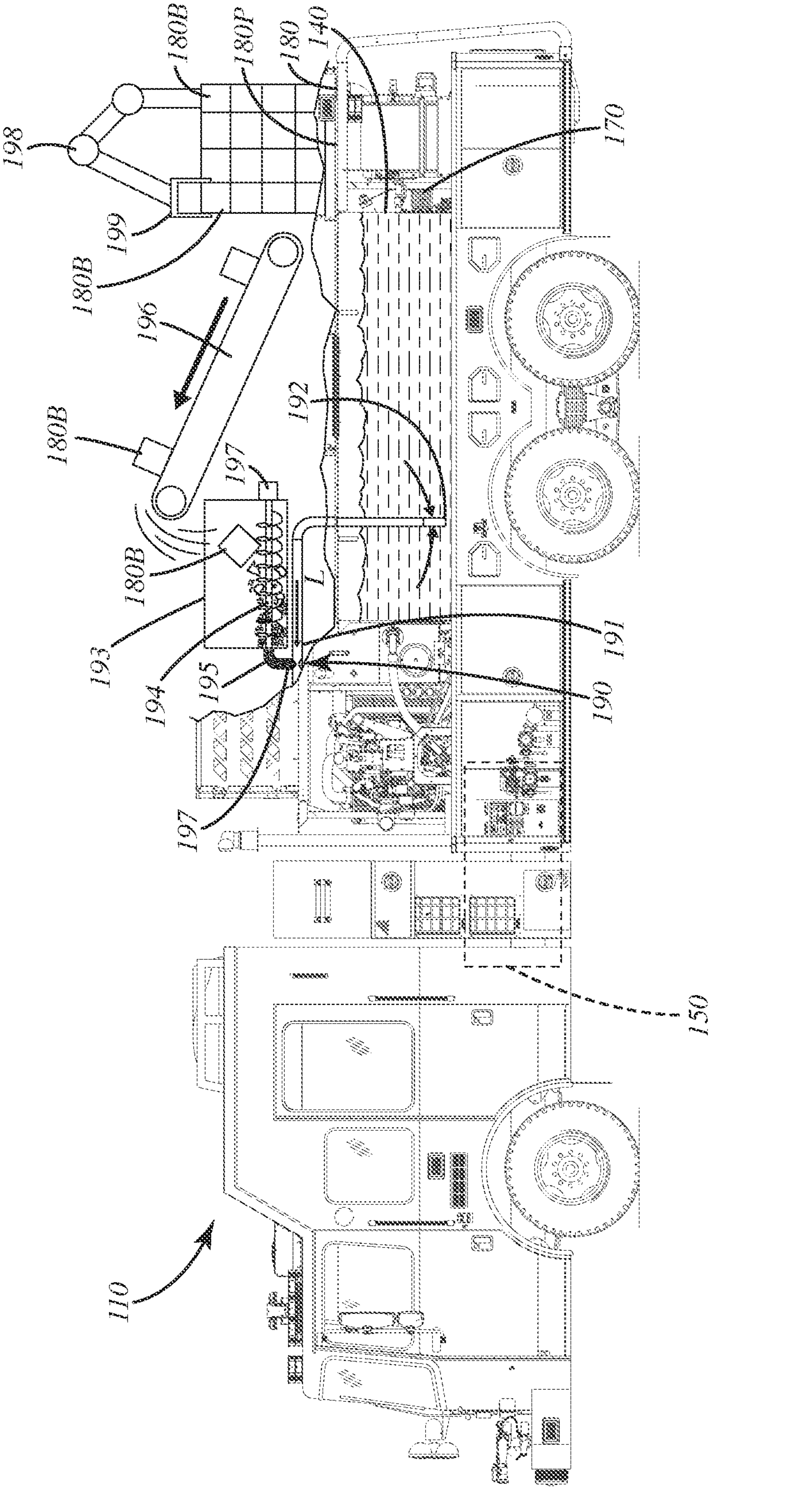
FIG. 8 is a side view of a first alternative embodiment including a venturi device.

In this embodiment, the venturi 290 can operate similar to the embodiment in FIG. 8. The venturi 290 can draw a vacuum to pull the fire retardant polymer 280B through the supply line 297 and into the venturi 290 so that as liquid L passes through the venturi, the fire retardant polymer mixes with it to produce a fire retardant coating material which can be expelled from the end 295 of the wand 292. With this more mobile mixing capability, the fire retardant coating material can be applied in smaller amounts or in more focused areas.

Optionally, although shown connected to a particular firefighting apparatus 210, the complete venturi wand assembly 298, including the wand 292, supply line 297 and container 280C for the fire retardant polymer, can be connected to any source of liquid or water. For example, the hose 291 can be attached to a different type of fire truck than the one described above. That fire truck can be a common pumper, aerial or other type of truck or emergency vehicle or trailer. In other applications, the hose 291 can be coupled to a common water pump, trash pump, pressure washer or hydrant so that water can be passed through the venturi 290 and mixed with the fire retardant polymer. The assembly 298 thus can be more mobile, and used at remote locations to apply the fire retardant coating material to vegetation, structures and other objects in the path of a fire. This assembly 298 can be sold to fire departments, as well as to businesses and homeowners to apply a fire retardant to structures, vegetation or other objects.

The following additional statements are provided, the numbering of which is not to be construed as designating levels of importance.

Statement 1: A firefighting apparatus comprising: a conduit that conveys liquid; a pump that pumps the liquid through the conduit; a venturi in fluid communication with the conduit; a supply line in fluid communication with the venturi and a container containing a flowable superabsorbent polymer; wherein the venturi produces a vacuum as the liquid flows through the venturi to pull the superabsorbent polymer from the container into the liquid to mix therewith; and a nozzle through which the mixed liquid and superabsorbent polymer is expelled onto an object to coat the object and impair the object from igniting by fire.

Statement 2: The apparatus of Statement 1, comprising a supply line from the container to the venturi, wherein the superabsorbent polymer is conveyed through the supply line to the venturi.

Statement 3: The apparatus of Statement 1 or 2, wherein the conduit, venturi and nozzle form a wand having a handle graspable by a user's hand.

Statement 4: The apparatus of any one of the preceding Statements, wherein the wand includes an actuator to actuate the flow of the liquid through the venturi.

Statement 5: A method of using a firefighting apparatus comprising: conveying a liquid through a venturi; producing a vacuum with the venturi; introducing a superabsorbent polymer into a stream of the liquid via the vacuum; mixing the liquid with the superabsorbent polymer in a conduit to produce a fire retardant coating material; expelling the fire retardant coating material on at least one of a structure and vegetation that is not on fire to impair the same from igniting on fire when subject to fire.

Statement 6: The method of Statement 4, wherein the venturi is disposed in a hand held wand, wherein the vacuum draws the superabsorbent polymer to the venturi through the supply line.

Statement 7: The method of Statement 4, wherein the superabsorbent polymer is in a powder or granular form, wherein the powder or granular form is drawn into the venturi via the vacuum from an external container.

Statement 8: The method of Statement 4, wherein the venturi is disposed in a handheld wand, wherein the fire retardant coating material is expelled from a nozzle of the handheld wand while an operator holds the wand.

Statement 9: A method of using a firefighting apparatus, comprising: positioning a fire truck on a tarmac of an airport in the path of a distressed aircraft, the fire truck including a primary pump powered by a primary engine that propels the fire truck and a secondary pump powered by a secondary engine mounted on the fire truck, a tank having a capacity of at least 2,000 gallons and an agitator disposed therein moveable under power of the secondary engine; dumping a fire retardant polymer through an access panel in an upper deck above the tank into a liquid in the tank; mixing a liquid and a fire retardant polymer in the tank with the agitator to produce a fire retardant coating material; conveying the fire retardant coating material from the tank out a nozzle and onto the tarmac along the path in anticipation of the distressed aircraft landing along the path and being on fire.

Statement 10: The method of Statement 9, wherein the fire truck moves along the tarmac on the path, wherein the secondary pump conveys the fire retardant coating material out of the nozzle which is located on the upper deck.

Statement 11: The method of any of Statements 9 and 10, comprising: moving a bale of fire retardant polymer over the deck and into the access panel before the distressed aircraft engages the tarmac; and dumping the bale into the liquid in the tank to mix.

Statement 12: The method of any of the Statements 9 through 11, comprising moving the fire truck at a speed of 1 to 10 miles per hour along the tarmac.

Statement 13: The method of Statement 9, wherein the distressed aircraft spills fuel on the tarmac and over an area including the fire retardant material.

Statement 14: The method of Statement 9, comprising: parking the fire truck in a stationary position and pumping the fire retardant material through the nozzle with the primary pump a distance of at least 50 feet from the fire truck.

Statement 15: The method of Statement 9, wherein the nozzle is one of a plurality of nozzles mounted atop an upper deck of the fire tuck, above the tank, wherein the plurality of nozzles swivel when discharging the fire retardant material therefrom.

Statement 16: The method of Statement 9, comprising; conveying the fire retardant material from the tank out of the nozzle by pumping the material with the primary pump while the fire truck is stationary; and conveying the fire retardant material from the tank out of the nozzle with the secondary pump while the fire truck is moving along the tarmac.

Statement 17: The method of Statement 9, comprising extending a telescoping nozzle a distance above the uppermost portion of the firefighting apparatus.

Statement 18: The method of Statement 16, wherein the secondary engine rotates the shaft at a speed of at least 10 RPMs via a hydraulic motor.

Statement 19: The method of Statement 9, comprising reloading bales of the fire retardant polymer onto the upper deck after opening a swing gate of railing surrounding the upper deck.

Statement 20: The method of Statement 9, wherein the upper deck includes a plurality of sidewalls that prevent the bales from falling off the upper deck, wherein the upper access panel includes a hinge, wherein the access panel swings about the hinge toward a sidewall so that the access panel attains an open position that is adjacent the sidewall.

Statement 21: The method of Statement 9, comprising refilling the tank with the liquid pumped with the primary pump directly into the tank.

Statement 22: The method of Statement 9, wherein the third sidewall rail includes a swing gate disposed above the ladder and hingedly secured thereto such that the swing gate is convertible to an open mode to gain access to the upper deck from the ladder so that a user of the ladder can transition from the ladder to the upper deck.

Statement 23: The method of Statement 9, comprising an upper deck located above the tank and body, the upper deck including a first side, a second side and a rear located above the rear of the apparatus, the upper deck defining an access panel hole and having an access panel removably mounted over the access panel hole, the upper deck configured to store a plurality of bales of a fire retardant polymer thereon, the fire retardant polymer being a superabsorbent polymer.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as “adjacent” versus “directly adjacent” and similar words. As used herein, the term “and/or” includes any and all combinations of one or more of the associated listed items.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles “a,” “an,” “the” or “said,” is not to be construed as limiting the element to the singular. Any reference to claim elements as “at least one of X, Y and Z” is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

What is claimed is:

1. A firefighting apparatus comprising:

a chassis including a longitudinal axis;

a drivetrain mounted to the chassis with a plurality of wheels joined with the drivetrain;

a primary engine mounted to the chassis and the drivetrain;

a cab mounted to the chassis, the cab including a front of the apparatus;

a body located rearward of the cab, the body including a rear of the apparatus, the body including a plurality of compartments having a plurality of doors that provide access to the compartments;

a tank mounted above the body and configured to store at least 2,000 gallons of liquid, the tank including external tank side walls that extend upward, above the plurality of doors, the tank storing a mixture of a liquid and a fire retardant polymer being a superabsorbent polymer that is obtained from at least one bale of superabsorbent polymer comprising a polyacrylate introduced into the tank;

an upper deck joined with the body and disposed above the tank, the upper deck including an upper access panel covering an opening of the tank, the upper deck configured to store thereon the at least one bale of superabsorbent polymer before the at least one bale is introduced into the tank, the upper deck being bounded by a plurality of sidewalls adapted to prevent the bales from falling off the upper deck, a primary pump capable of pumping liquid, the primary pump being powered by the engine and operably connected to the drivetrain, the primary pump including a first intake configured to be attached to an external water source via a hose, a first discharge, and a second intake in fluid communication with the tank and the first discharge so that contents from the tank are selectively pumpable by the primary pump, out the first discharge;

a secondary pump mounted above the body, the secondary pump being a standalone pump distal from and operably disconnected from the engine and the drivetrain, the secondary pump in fluid communication with the tank and a plurality of nozzles mounted above the chassis and above an uppermost portion of the body;

an elongated shaft rotatably disposed in the tank and including at least one paddle that engages the liquid in the tank to provide a mixing action to the mixture of the liquid and the fire retardant polymer to produce a fire retardant coating material within the tank;

a plurality of warning lights mounted to the body that are compliant with National Fire Protection Association Standard 1901, wherein the secondary pump is operable in a pump and roll mode in which the secondary pump conveys the fire retardant coating material from the tank to the plurality of nozzles for expulsion therefrom at least 50 feet away from the firefighting apparatus onto at least one object to impair ignition of the at least one object when contacted by fire;

wherein the primary pump is operable in a tank fill mode in which the primary pump conveys the liquid from the external water source into the tank, wherein the primary pump is operable in an offload mode in which the primary pump is in fluid communication with the tank to convey the fire retardant coating material from the tank and external to the firefighting apparatus.

2. The firefighting apparatus of claim 1, comprising:

an infrared image capture device projecting above the body and configured to capture images of the environment around the firefighting apparatus;

a display mounted in the cab and configured to display the images of the environment around the firefighting apparatus as the plurality of nozzles discharge the fire retardant coating material therefrom, wherein the infrared image capture device is telescopingly mounted to at least one of the chassis and the body, such that the infrared image capture device can be elevated a preselected distance above an uppermost surface of the firefighting apparatus, the preselected distance being at least one foot.

3. The firefighting apparatus of claim 1 comprising:

a hose reel having a hose disposed thereon, the hose reel mounted rearward of the tank and under the upper deck, closer to the rear of the apparatus than the access panel.

4. The firefighting apparatus of claim 1, wherein the cross lay hose compartment stores an attack hose folded upon itself in a serpentine manner, wherein the attack hose is configured to attach to the first discharge.

5. The firefighting apparatus of claim 1, wherein the plurality of nozzles are operable in a lowered mode that maintains the plurality of nozzles at a height of less than 12 feet from the ground level, wherein the plurality of nozzles are operable in a raised mode that maintains the plurality of nozzles at a height of greater than 12 feet from the ground level.

6. The firefighting apparatus of claim 1, wherein the rear of the apparatus includes a first warning light and a second warning light of the plurality of warning lights that are disposed on opposite sides of the longitudinal axis, wherein a ladder is joined with the rear of the apparatus and extends downward past the body between the first warning light and the second warning light, wherein the ladder includes a first rung and a second rung, wherein the first rung is separated from the second rung by a distance that is less than 24 inches.

7. The firefighting apparatus of claim 1, comprising:

a secondary engine separate and distal from the primary engine;

a hydraulic motor joined with the secondary engine, wherein the elongated shaft is joined with the hydraulic motor.

8. The firefighting apparatus of claim 7, wherein the hydraulic motor rotates the elongated shaft at a rotational speed of at least 25 RPMs inside the tank.

9. The apparatus of claim 1, wherein the upper access panel includes a hinge, wherein the access panel swings about the hinge toward a sidewall so that the access panel attains an open position that is adjacent the sidewall.

10. The apparatus of claim 9, wherein the sidewall includes a sidewall rail and a swing gate disposed above a ladder joined with the body and hingedly secured to the sidewall such that the swing gate is convertible to an open mode to gain access to the upper deck from the ladder so that a user of the ladder can transition from the ladder to the upper deck.

11. A firefighting apparatus comprising:

a chassis including a longitudinal axis;

a drivetrain mounted to the chassis with a plurality of wheels joined with the drivetrain;

a primary engine mounted to the chassis and the drivetrain;

a cab mounted to the chassis, the cab including a front of the apparatus;

a body located rearward of the cab, the body including a rear of the apparatus, the body including a plurality of compartments having a plurality of doors that provide access to the compartments;

a tank mounted above the body and having a capacity of at least 2,000 gallons, the tank storing a mixture of a liquid and a fire retardant polymer that forms a fire retardant coating material;

an agitator disposed in the tank and engaging the liquid in the tank to provide a mixing action to the mixture of the liquid and the fire retardant polymer to produce the fire retardant coating material within the tank;

a plurality of warning lights mounted to the body that are compliant with National Fire Protection Association Standard 1901;

an upper deck mounted above the tank bounded by a plurality of sidewalls having a plurality of corresponding sidewall rails extending around the upper deck, the upper deck configured to support a plurality of bales of the fire retardant polymer being a superabsorbent polyacrylate material, the plurality of sidewalls surrounding the plurality of bales to prevent the plurality of bales from falling off the upper deck, the upper deck including an access panel disposed over an access hole leading to the tank, the access panel openable so that a preselected one of the bales is selectively addable through the access hole to the tank to mix with the liquid;

a primary pump capable of pumping liquid, the pump being powered by the primary engine, the primary pump including a first intake configured to be attached to an external water source via a hose, a first discharge, and a second intake in fluid communication with the tank and the first discharge so that the fire retardant coating material in the tank is selectively pumpable by the primary pump, out the first discharge; and a secondary pump mounted above the body, the secondary pump in fluid communication with the tank and a plurality of nozzles mounted to the apparatus and configured to propel the fire retardant coating material from the plurality of nozzles onto a plurality of objects to coat the objects therewith and impair the object from igniting when engaged by fire, the secondary pump being a standalone pump disconnected from the primary engine and drivetrain, and operated via a secondary combustion engine mounted above and distal from the primary engine and drivetrain, the secondary pump operable in a pump and roll mode in which the secondary pump conveys the fire retardant coating material from the tank to a plurality of nozzles mounted above an uppermost portion of the body for expulsion therefrom at least 50 feet away from the firefighting apparatus.

12. The firefighting apparatus of claim 11, wherein the plurality of nozzles are telescopingly mounted to at least one of the body and the chassis, and are operable to be automatically raised above the body, wherein the primary pump is operable in a tank fill mode in which the primary pump conveys the liquid from the external water source into the tank so that the liquid can mix with a fire retardant coating material in the tank.

13. The firefighting apparatus of claim 11, wherein the primary pump is operable in an offload mode in which the primary pump is in fluid communication with the tank to convey the liquid mixed with the fire retardant material from the tank to a container external to the firefighting apparatus.

14. The firefighting apparatus of claim 11, comprising:

an infrared image capture device projecting above the body and configured to capture images of the environment around the firefighting apparatus;

a display mounted in the cab and configured to display the images of the environment around the firefighting apparatus.

15. The firefighting apparatus of claim 14, wherein the infrared image capture device is telescopingly mounted to at least one of the chassis and the body, such that the infrared image capture device can be elevated a preselected distance above an uppermost surface of the firefighting apparatus, the preselected distance being at least one foot.

16. The firefighting apparatus of claim 11, wherein the agitator comprises a shaft and a plurality of paddles that rotate inside the tank to mix the mixture, wherein the shaft rotates at a rotational speed of at least 10 RPMs inside the tank.

17. The firefighting apparatus of claim 16, comprising:

a secondary internal combustion engine separate and distal from the primary engine;

a hydraulic motor joined with the secondary engine, wherein the shaft is joined with the hydraulic motor.

18. A firefighting apparatus comprising:

a chassis including a longitudinal axis;

a drivetrain mounted to the chassis with a plurality of wheels joined with the drivetrain;

a primary engine mounted to the chassis and the drivetrain;

a cab mounted to the chassis, the cab including a front of the apparatus;

a body located rearward of the cab, the body including a rear of the apparatus, the body including a plurality of compartments having a plurality of doors that provide access to the compartments;

a tank mounted above the body and having a capacity of at least 2,000 gallons, the tank storing a mixture of a liquid and a fire retardant polymer that forms a fire retardant coating material;

an upper deck mounted above the tank bounded by a plurality of sidewalls, the upper deck configured to support a plurality of bales of the fire retardant polymer being a superabsorbent polyacrylate material, the plurality of sidewalls surrounding the plurality of bales to prevent the plurality of bales from falling off the upper deck, the upper deck including an access panel disposed over an access hole leading to the tank, the access panel openable so that a bale of the fire retardant polymer can be added through the access hole to the tank to mix with the liquid;

an agitator disposed in the tank, the agitator moving and engaging the liquid in the tank to provide a mixing action to the mixture of the liquid and the fire retardant polymer to produce the fire retardant coating material within the tank;

a plurality of warning lights mounted to the body that are compliant with National Fire Protection Association Standard 1901;

a primary pump capable of pumping liquid, the pump being powered by the primary engine, the primary pump including a first intake configured to be attached to an external water source via a hose, a first discharge, and a second intake in fluid communication with the tank and the first discharge so that the fire retardant coating material in the tank is selectively pumpable by the primary pump, out the first discharge; and a secondary pump mounted above the body, the secondary pump in fluid communication with the tank and a plurality of nozzles mounted to the apparatus and configured to propel the fire retardant coating material from the plurality of nozzles onto a plurality of objects to coat the objects therewith and impair the object from igniting when engaged by fire, the secondary pump operable in a pump and roll mode in which the secondary pump conveys the fire retardant coating material from the tank to a plurality of nozzles mounted above an uppermost portion of the body for expulsion therefrom at least 50 feet away from the firefighting apparatus, wherein the primary pump is operable in a tank fill mode in which the primary pump conveys the liquid from the external liquid source into the tank, so that no other pump external to the firefighting apparatus is needed to fill the tank.

* * * * *